United States Patent
Daudet et al.

(10) Patent No.: US 9,849,497 B2
(45) Date of Patent: Dec. 26, 2017

(54) TEARDROP AND OFFSET NOTCH BRIDGING CONNECTOR

(71) Applicants: Larry Randall Daudet, Brentwood, CA (US); Paul Howard Oellerich, Hayward, CA (US)

(72) Inventors: Larry Randall Daudet, Brentwood, CA (US); Paul Howard Oellerich, Hayward, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 498 days.

(21) Appl. No.: 13/802,676

(22) Filed: Mar. 13, 2013

(65) Prior Publication Data

US 2014/0270923 A1    Sep. 18, 2014

(51) Int. Cl.
*E04B 1/41* (2006.01)
*B21D 35/00* (2006.01)
*E04B 2/76* (2006.01)
*F16B 7/04* (2006.01)

(52) U.S. Cl.
CPC ............ *B21D 35/002* (2013.01); *E04B 2/763* (2013.01); *F16B 7/0493* (2013.01); *Y10T 403/50* (2015.01)

(58) Field of Classification Search
CPC ..... B21D 35/002; E04B 2/763; F16B 7/0493; Y10T 403/50
See application file for complete search history.

(56) References Cited

U.S. PATENT DOCUMENTS

| | | |
|---|---|---|
| 529,154 A | 11/1894 | Banks |
| 719,191 A | 1/1903 | Collins |
| 992,941 A | 5/1911 | Danielson |
| 1,101,745 A | 6/1914 | Jones |
| 1,346,426 A | 7/1920 | Sherbner |
| 1,791,197 A | 2/1931 | Dickson |
| 2,365,501 A | 12/1944 | Walstrom |
| 2,873,828 A | 2/1959 | Zitomer |
| 2,900,677 A | 8/1959 | Yetter |
| 2,905,426 A | 9/1959 | Ross |
| 2,918,995 A | 12/1959 | Kruger |
| 3,083,794 A | 4/1963 | Stovail |
| 3,102,306 A | 9/1963 | Hutchinson |
| 3,126,928 A | 3/1964 | McMillan |
| 3,299,839 A | 1/1967 | Nordbak |
| 3,322,447 A | 5/1967 | Biggs |
| 3,482,369 A | 12/1969 | Burke |

(Continued)

FOREIGN PATENT DOCUMENTS

| | | | |
|---|---|---|---|
| DE | 8012148 U1 * | 10/1980 | ............. E04B 2/763 |
| EP | 2395168 A1 * | 12/2011 | ............ E04B 2/7457 |

(Continued)

OTHER PUBLICATIONS

"Metal-Lite Products". Metal Lite website, metal-lite.net. Accessed Sep. 20, 2013, one page. Metal Lite 2012, USA.

(Continued)

*Primary Examiner* — Matthieu F Setliff
(74) *Attorney, Agent, or Firm* — James R. Cypher; Charles R. Cypher

(57) ABSTRACT

A connection between metal studs and bridging members using a separate light gauge bridging connector with teardrop-shaped interface notches and longitudinally-offset interface notches.

36 Claims, 13 Drawing Sheets

(56) References Cited

U.S. PATENT DOCUMENTS

| | | | |
|---|---|---|---|
| 3,490,604 A | 1/1970 | Klein | |
| 3,606,227 A | 9/1971 | Klein | |
| 3,653,172 A | 4/1972 | Schwartz | |
| 3,778,952 A | 12/1973 | Soucy | |
| 3,858,988 A | 1/1975 | Cohen | |
| 3,897,163 A | 7/1975 | Holmes | |
| 3,972,169 A | 8/1976 | Sheppard, Jr. | |
| 4,018,020 A | 4/1977 | Sauer et al. | |
| 4,027,453 A | 6/1977 | Bridge | |
| 4,043,689 A | 8/1977 | Spencer | |
| 4,075,810 A | 2/1978 | Zakrzewski et al. | |
| 4,128,979 A | 12/1978 | Price | |
| 4,140,417 A | 2/1979 | Danielsen et al. | |
| 4,174,911 A | 11/1979 | Maccario et al. | |
| 4,208,851 A | 6/1980 | Sauer | |
| 4,235,054 A | 11/1980 | Cable et al. | |
| 4,246,736 A | 1/1981 | Kovar et al. | |
| 4,406,374 A | 9/1983 | Yedor | |
| 4,426,822 A | 1/1984 | Gailey | |
| 4,428,172 A | 1/1984 | Larsson | |
| 4,448,004 A | 5/1984 | Thorsell | |
| 4,464,074 A | 8/1984 | Green | |
| 4,480,941 A | 11/1984 | Gild et al. | |
| 4,516,874 A | 5/1985 | Yang et al. | |
| 4,522,009 A | 6/1985 | Fingerson | |
| 4,586,841 A | 5/1986 | Hunter | |
| 4,625,415 A | 12/1986 | Diamontis | |
| 4,693,047 A | 9/1987 | Menchetti | |
| 4,791,766 A | 12/1988 | Egri, II | |
| 4,809,476 A | 3/1989 | Satchell | |
| 4,840,005 A | 6/1989 | Cochrane | |
| 4,850,169 A | 7/1989 | Burkstrand et al. | |
| 4,858,407 A | 8/1989 | Smolik | |
| 4,864,791 A | 9/1989 | Platt | |
| 4,912,894 A | 4/1990 | Platt | |
| 4,914,878 A | 4/1990 | Tamaki et al. | |
| 4,916,877 A | 4/1990 | Platt | |
| 4,951,436 A | 8/1990 | Burkstrand et al. | |
| 5,092,100 A | 3/1992 | Lambert et al. | |
| 5,104,252 A | 4/1992 | Colonias et al. | |
| 5,127,760 A | 7/1992 | Brady | |
| 5,155,962 A | 10/1992 | Burkstrand et al. | |
| 5,189,857 A | 3/1993 | Herren | |
| 5,274,973 A | 1/1994 | Liang | |
| 5,287,664 A | 2/1994 | Schiller | |
| 5,325,651 A | 7/1994 | Meyer et al. | |
| 5,363,622 A | 11/1994 | Sauer | |
| 5,403,110 A | 4/1995 | Sammann | |
| 5,446,969 A | 9/1995 | Terenzoni | |
| 5,555,694 A | 9/1996 | Commins | |
| 5,600,926 A | 2/1997 | Ehrlich | |
| 5,603,580 A | 2/1997 | Leek et al. | |
| 5,605,024 A | 2/1997 | Sucato et al. | |
| 5,632,128 A | 5/1997 | Agar | |
| 5,664,392 A | 9/1997 | Mucha | |
| 5,669,198 A | 9/1997 | Ruff | |
| 5,671,580 A | 9/1997 | Chou | |
| 5,682,935 A | 11/1997 | Bustamante | |
| 5,697,725 A | 12/1997 | Ballash et al. | |
| 5,720,138 A | 2/1998 | Johnson | |
| 5,784,850 A | 7/1998 | Elderson | |
| 5,876,006 A | 3/1999 | Sharp | |
| 5,899,041 A | 5/1999 | Durin | |
| 5,904,023 A | 5/1999 | diGirolamo | |
| 5,921,411 A | 7/1999 | Merl | |
| 5,943,838 A | 8/1999 | Madsen | |
| 5,964,071 A | 10/1999 | Sato | |
| 6,021,618 A | 2/2000 | Elderson | |
| 6,101,780 A | 8/2000 | Kreidt | |
| 6,164,028 A | 12/2000 | Hughes | |
| 6,199,336 B1 | 3/2001 | Poliquin | |
| 6,242,698 B1 | 6/2001 | Baker, III et al. | |
| 6,260,318 B1 | 7/2001 | Herren | |
| 6,290,214 B1 | 9/2001 | DeSouza | |
| 6,295,781 B1 | 10/2001 | Thompson | |
| 6,301,854 B1 | 10/2001 | Daudet et al. | |
| 6,315,137 B1 | 11/2001 | Mulford | |
| 6,418,695 B1 | 7/2002 | Daudet | |
| D463,575 S | 9/2002 | Daudet | |
| 6,523,321 B1 | 2/2003 | Leek et al. | |
| 6,578,335 B2 | 6/2003 | Poliquin | |
| 6,644,603 B2 | 11/2003 | Bailleux | |
| 6,662,520 B1 | 12/2003 | Nelson | |
| 6,688,069 B2 | 2/2004 | Zadeh | |
| 6,694,695 B2 | 2/2004 | Collins | |
| 6,701,689 B2 | 3/2004 | diGirolamo | |
| 6,702,270 B1 | 3/2004 | Reschke | |
| 6,708,460 B1 | 3/2004 | Elderson | |
| 6,739,562 B2 | 5/2004 | Rice | |
| 6,792,733 B2 | 9/2004 | Wheeler | |
| 6,920,734 B2 | 7/2005 | Elderson | |
| 7,017,310 B2 | 3/2006 | Brunt | |
| 7,021,021 B2 | 4/2006 | Saldana | |
| 7,104,024 B1 | 9/2006 | diGirolamo et al. | |
| 7,159,369 B2 | 1/2007 | Elderson | |
| 7,168,219 B2 | 1/2007 | Elderson | |
| 7,174,690 B2 | 2/2007 | Zadeh | |
| D558,039 S | 12/2007 | Skinner | |
| 7,334,372 B2 | 2/2008 | Evans et al. | |
| D573,873 S | 7/2008 | Wall | |
| 7,398,621 B2 | 7/2008 | Banta | |
| 7,503,150 B1 | 3/2009 | diGirolamo | |
| 7,520,100 B1 | 4/2009 | Herrman | |
| 7,559,519 B1 | 7/2009 | Dragic | |
| 7,596,921 B1 | 10/2009 | diGirolamo | |
| 7,634,889 B1 | 12/2009 | diGirolamo et al. | |
| 7,739,850 B2 | 6/2010 | Daudet | |
| 7,836,657 B1 | 11/2010 | diGirolamo | |
| 7,955,027 B2 | 6/2011 | Nourian et al. | |
| 8,011,160 B2 | 9/2011 | Rice | |
| D648,249 S | 11/2011 | Noble et al. | |
| 8,083,187 B2 | 12/2011 | Bernard et al. | |
| D657,891 S | 4/2012 | Jones | |
| 8,167,250 B2 | 5/2012 | White | |
| 8,205,402 B1 | 6/2012 | diGirolamo | |
| 8,225,581 B2 | 7/2012 | Strickland et al. | |
| D667,249 S | 9/2012 | London | |
| D667,718 S | 9/2012 | Preda | |
| 8,387,321 B2 | 3/2013 | diGirolamo et al. | |
| 8,528,292 B2 | 9/2013 | Morey | |
| D692,746 S | 11/2013 | Lawson et al. | |
| 8,590,255 B2 * | 11/2013 | Daudet | E04B 2/763 52/243 |
| 8,813,456 B2 * | 8/2014 | Lin | E04B 2/763 52/243 |
| 9,109,361 B2 | 8/2015 | Daudet et al. | |
| 2002/0046525 A1 * | 4/2002 | Rice | E04B 2/7457 52/481.1 |
| 2002/0059773 A1 | 5/2002 | Elderson | |
| 2003/0009980 A1 | 1/2003 | Shahnazarian | |
| 2003/0037494 A1 | 2/2003 | Collins | |
| 2003/0089053 A1 | 5/2003 | Elderson | |
| 2003/0106280 A1 * | 6/2003 | diGirolamo | E04B 2/7457 52/656.1 |
| 2003/0145537 A1 | 8/2003 | Bailey | |
| 2003/0167722 A1 | 9/2003 | Klein et al. | |
| 2007/0251186 A1 | 11/2007 | Rice | |
| 2010/0031601 A1 | 2/2010 | Lin | |
| 2010/0126103 A1 | 5/2010 | diGirolamo et al. | |
| 2011/0154770 A1 | 6/2011 | Friis | |
| 2013/0104490 A1 | 5/2013 | Daudet et al. | |
| 2014/0047792 A1 | 2/2014 | Daudet et al. | |

FOREIGN PATENT DOCUMENTS

| | | | |
|---|---|---|---|
| JP | 57187316 U | | 11/1982 |
| JP | S57-187316 U | * | 11/1982 |

(56) References Cited

FOREIGN PATENT DOCUMENTS

JP           S61-020809 U   *   2/1986
NL              7908371 A   *   6/1981   ............. E04B 2/763

OTHER PUBLICATIONS

U.S. Appl. No. 13/845,057, "Inverted Bridging Connector". Unpublished (filed Mar. 7, 2013), (Daudet, Larry R. and Oellerich, Paul H., Applicants), application p. 1-38; drawings p. 1-10.
"Construction Dimensions", Apr. 2012, cover page and Simpson Strong-Tie/SUBH advertisement page, SFCFS12-E, Association of the Wall and Ceiling Industry (AWCI), USA.
"SUBH/MSUBH: Bridging Connectors for Cold-Formed Steel Stud Construction", Simpson Strong-Tie Company flier, Apr. 1, 2012, 2 pages, S-SUBHMSUBH12, Simpson Strong-Tie Company, Inc., Pleasanton, CA, USA.
"Bridging, Bracing & Backing: Spazzer 5400 Spacer Bar (SPZS), Bar Guard (SPBG) & Grommet (SPGR)". Clip Express Product Catalog: Clips, Connectors & Framing Hardware, Apr. 2012, p. 77. Clark Dietrich Building Systems, USA.
Communication Pursuant to Article 94(3) EPC and Examination Report, Application No. 13,824,697.0, Jan. 11, 2017, 6 pages, European Patent Office, Netherlands.
European Search Report, Application No. EP15153720, Dec. 15, 2016, 8 pages, European Patent Office, Germany.
Examination Report No. 1 for Standard Patent Application and Report Details, Application No. 2013383340, Feb. 2, 2017, 3 pages, IP Australia.
Examination Report No. 1 for Standard Patent Application and Report Details, Application No. 2013384149, Feb. 13, 2017, 3 pages, IP Australia.
International Preliminary Report on Patentability, Application No. PCT/US2013/075857, Sep. 24, 2015, 15 pages including cover, International Bureau of WIPO, Switzerland.
Invitation to Pay Additional Fees and Communication Relating to the Results of the Partial International Search, Application No. PCT/US2013/075857, Apr. 7, 2014, 7 pages, International Searching Authority, Netherlands.
"U-Channel Bridging Connectors for Cold-Formed Steel Construction", Simpson Strong-Tie Product Flyer, Sep. 1, 2012, front and back cover pages and pp. 2-11, vol. F-SUBHMSUBH12, Simpson Strong-Tie Company, Inc., Pleasanton, CA.
"Wall Bridging Detail". NuconSteel Product Catalog, 2003, front cover, table of contents, p. 34. NuconSteel., USA.
"Double Deep-Leg Track", "Bridge Clip Installation", "BC600 & BC800 Installation", "BridgeBar", "BridgeClip", "BC600 or BC800". The Steel Network, Inc. Product Catalog, Jan. 2004, front cover, p. 11, 27, 49. Steel Network, Inc., USA.
"Mantisgrip Product Catalog 2012". Catalog, 2012, 10 pages and cover. Mantisgrip 2012, USA.
International Preliminary Report on Patentability by International Bureau of the Patent Cooperation Treaty (PCT), Application No. PCT/US2013/075843, Oct. 1, 2015, 8 pages, The International Bureau of WIPO, Geneva, Switzerland.

* cited by examiner

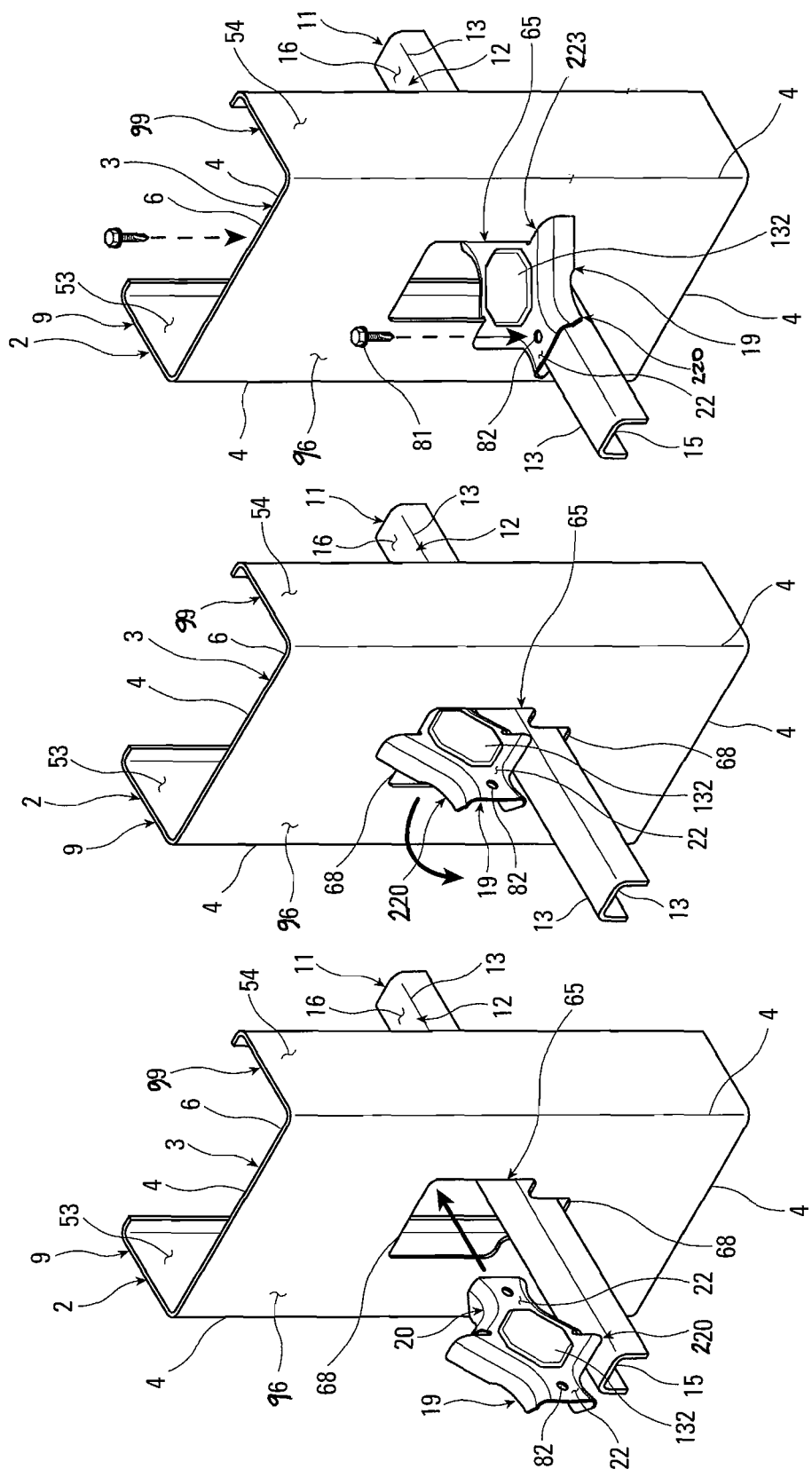

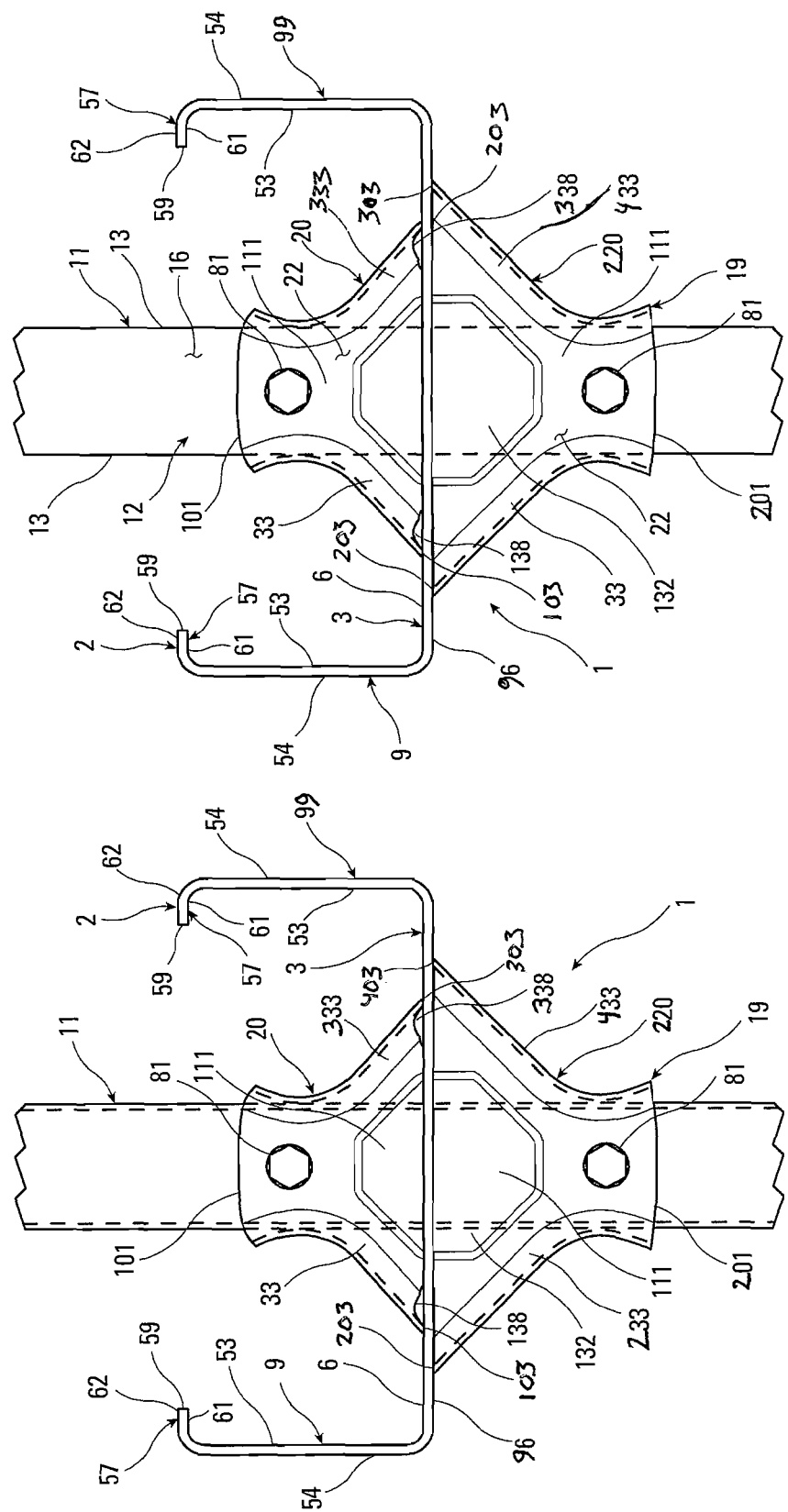

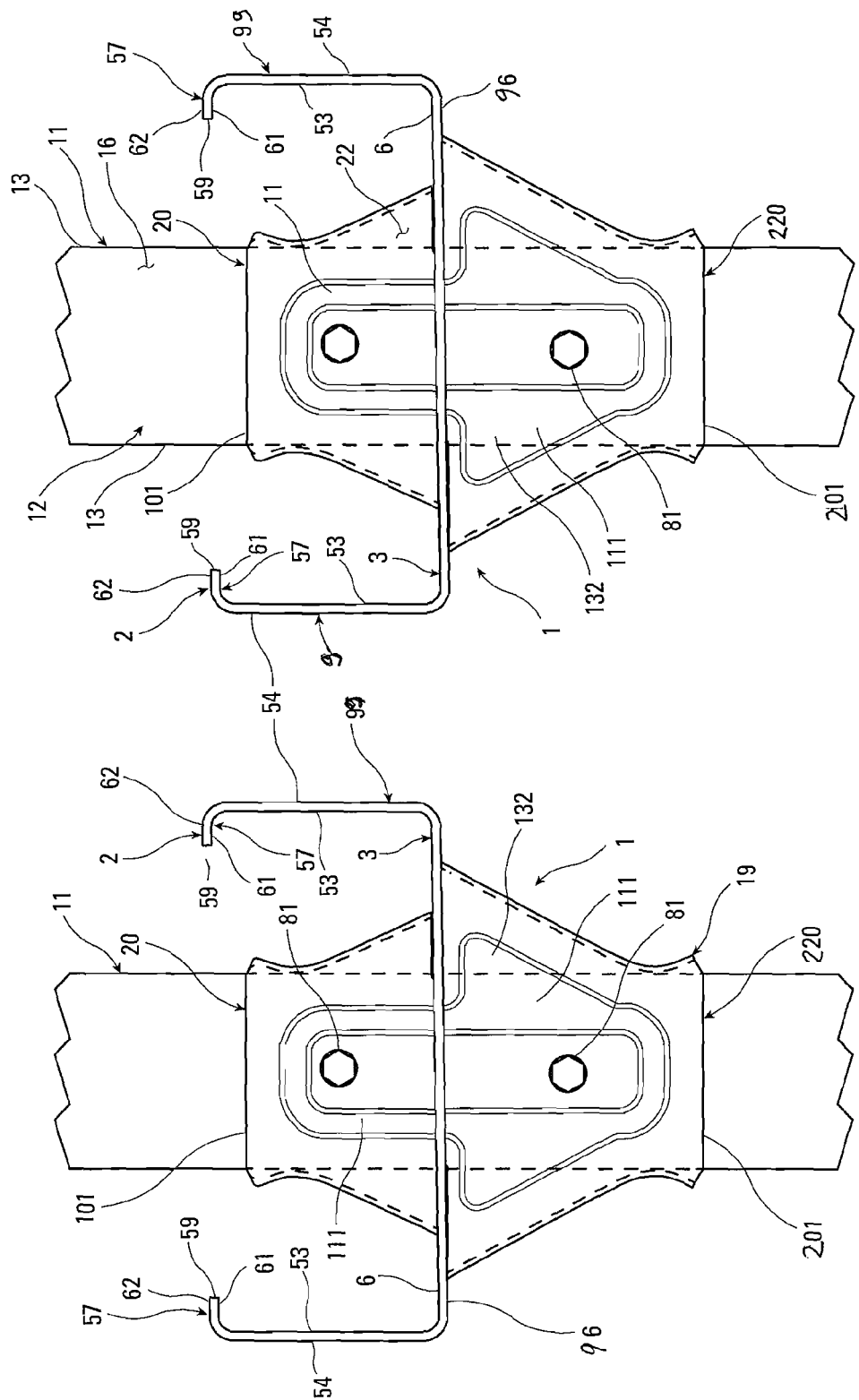

TEARDROP AND OFFSET NOTCH BRIDGING CONNECTOR

BACKGROUND OF THE INVENTION

The present invention relates to steel stud building wall systems and especially to apparatuses for stabilizing steed studs to prevent lateral movement and torsion in such systems.

Many industrial, and a growing number of residential, buildings are constructed with steel stud wall framing for a variety of reasons. Steel framing is fireproof, does not warp, cannot be infested, and does not rot. When a wall is built with any kind of stud, wood or steel, it is generally desirable to fix sequential studs relative to each other and each against lateral movement and torsion. In wood-stud walls, a short piece of wood blocking is typically nailed to adjacent stud pairs to stabilize them. In steel-stud walls, an elongated steel bridging member is typically inserted horizontally through pre-punched openings in a series of vertical studs to keep them aligned. Steel studs have excellent columnar strength when they are straight, but a significant portion of that strength is lost if the studs are twisted. Because steel studs are particularly vulnerable to torsion, the bridging member, which is typically channel-shaped, having a horizontal web and two vertical side flanges, is made to closely fit the openings in the vertical studs in order to maximize torque resistance. In additional to mechanical torque, metal studs can twist or bend in response to the heat of a fire when the drywall sheathing, which acts as a firebreak, is destroyed. When metal studs twist or bend, they lose their weight-bearing capacity, multiplying the damage caused directly by fire.

While channel-shaped bridging members closely received in the openings can help restrain the studs from twisting, some twisting can still occur and the studs can still shift or bend parallel to the wall. A variety of sheet metal brackets, beginning with a simple right angle, have been designed to prevent this shifting or bending. The prior art brackets are all relatively labor intensive to install and their connections are all relatively weak. For example, with the simple right angle bracket, the installer places the horizontal leg of the bracket on the bridging member and the vertical leg of the bracket against the web of the wall stud. Screws are inserted through both legs to attach the bracket to the bridging member and the stud. The bracket relies on the screw connections to function, and the installer must ensure that the bracket is placed correctly. Later prior art brackets have improved on this basic connection.

The prior art also includes short bridging members that, like the wood blocking members mentioned above, span only adjacent studs and have ends tailored for fastening the wall studs, but these bridging members are relatively expensive because they use additional material to form the ends, they require a large number of fasteners, and they are necessarily of fixed length, which makes them useless if the spacing between any two studs has to be varied from the norm.

The prior art also includes elongated bridging members with a series of slots that are designed for mating with the opening in the wall stud webs, but these make relatively weak connections and also have the disadvantage that they cannot accommodate any variation in the spacing between studs.

It is an object of the present invention to provide a bracket that uses less material than prior art brackets, installs faster and more easily using fewer fasteners, and forms a connection that is stronger, resisting both lateral and torsional loads better than the prior art. The present invention is especially well-suited to interior drywall framing, which uses lighter, smaller structural members than those used to frame exterior structural walls.

SUMMARY OF THE INVENTION

The present invention provides a connector for firmly connecting and stabilizing a building wall steel stud in concert with a bridging member, employing a bridging connector with notches that are away from the central web of the wall stud in order to more firmly interface with it away from the edges of the web opening in which the connector is installed.

The present invention employs a bridging connector that has multiple points of improved interface with the central web of the wall stud, and therefore improved performance of the connection.

The present invention employs a bridging connector with depending flanges, the ends of which firmly interface with the central web of the wall stud for an improved interface, and therefore improved performance of the connection.

The present invention employs a bridging connector with interface edges that are not directly opposed through the central web of the wall stud, resulting in an improved interface and therefore improved performance of the connection.

The present invention employs a bridging connector with an octagonal stiffening embossment that allows the connector to be made from lighter materials than would otherwise be possible.

The present invention employs a method of making a bridging connector that includes forming notches with arced edge portions that are created by bending down the side flanges, simplifying the method and making the bridging connector less costly to produce.

The present invention employs a bridging connector with longitudinally-offset notches that create a tighter interface with the central web of the wall stud and therefore result in improved performance in the connection.

The present invention provides a connector for firmly connecting and stabilizing a building wall steel stud in concert with a bridging member. The bridging member passes through an opening in each of several studs in a section of a wall. The bridging member is designed to keep the studs in alignment along the length of the wall when it is installed through the studs.

The present invention provides a connector with edges that interlock with the web of a wall stud to provide exceptional torsional rigidity. The edges are braced by the body plates of the connector, allowing them to resist substantially higher loads than flanges adjacent to the web of the wall stud.

The present invention provides a connector with edges or similarly narrow lines that interface with the sides of the bridging members that connect wall studs, also providing exceptional torsional rigidity. These narrow interfaces are braced by flanges that intersect with the sides of the bridging members instead of being positioned alongside and parallel to the sides of the bridging members.

The interfaces with the sides of the bridging members are further reinforced by bracing the opposite ends of the flanges against the web of the wall stud, so that the diagonal flanges are trapped between the sides of the bridging members and the web of the wall stud.

The exceptional strength of the interlocking connections between the bridging connector, the bridging member and the wall stud allow the bridging connector to be firmly connected with a single fastener that attaches the body of the bridging connector to the bridging member.

BRIEF DESCRIPTION OF THE DRAWINGS

FIG. 2 is an upper front right perspective view of a bridging connector formed according to the present invention before it is inserted in the elongated opening in the web of a typical cold-formed steel wall stud above a typical cold-formed steel bridging member.

FIG. 3 is an upper front right perspective view of a bridging connector formed according to the present invention as it is being inserted in the elongated opening in the web of a typical cold-formed steel wall stud above a typical cold-formed steel bridging member.

FIG. 4 is an upper front right perspective view of a bridging connector formed according to the present invention interfacing with the sides of the elongated opening in the web of a typical cold-formed steel wall stud and resting on a typical cold-formed steel bridging member before being attached to the bridging member with one or more separate fasteners.

FIG. 5 is a top plan view of a connection made between a typical cold-formed steel wall stud, a typical cold-formed steel bridging member, and the preferred form of the bridging connector of the present invention, showing the portion of the bridging member below the bridging connector, the inner surfaces of the boundary flanges of the bridging connector, and the inner surfaces of the side flanges of the bridging connector in phantom line.

FIG. 6 is a top plan view of connection made between a typical cold-formed steel wall stud, a typical cold-formed steel bridging member, and the preferred form of the bridging connector of the present invention.

FIG. 19 is a top plan view of a connection made between a typical cold-formed steel wall stud, a typical cold-formed steel bridging member, and the preferred form of the bridging connector of the present invention, showing the portion of the bridging member below the bridging connector, the inner surfaces of the boundary flanges of the bridging connector, and the inner surfaces of the side flanges of the bridging connector in phantom line.

FIG. 20 is a top plan view of connection made between a typical cold-formed steel wall stud, a typical cold-formed steel bridging member, and the preferred form of the bridging connector of the present invention.

DETAILED DESCRIPTION OF THE INVENTION

Figure 1:
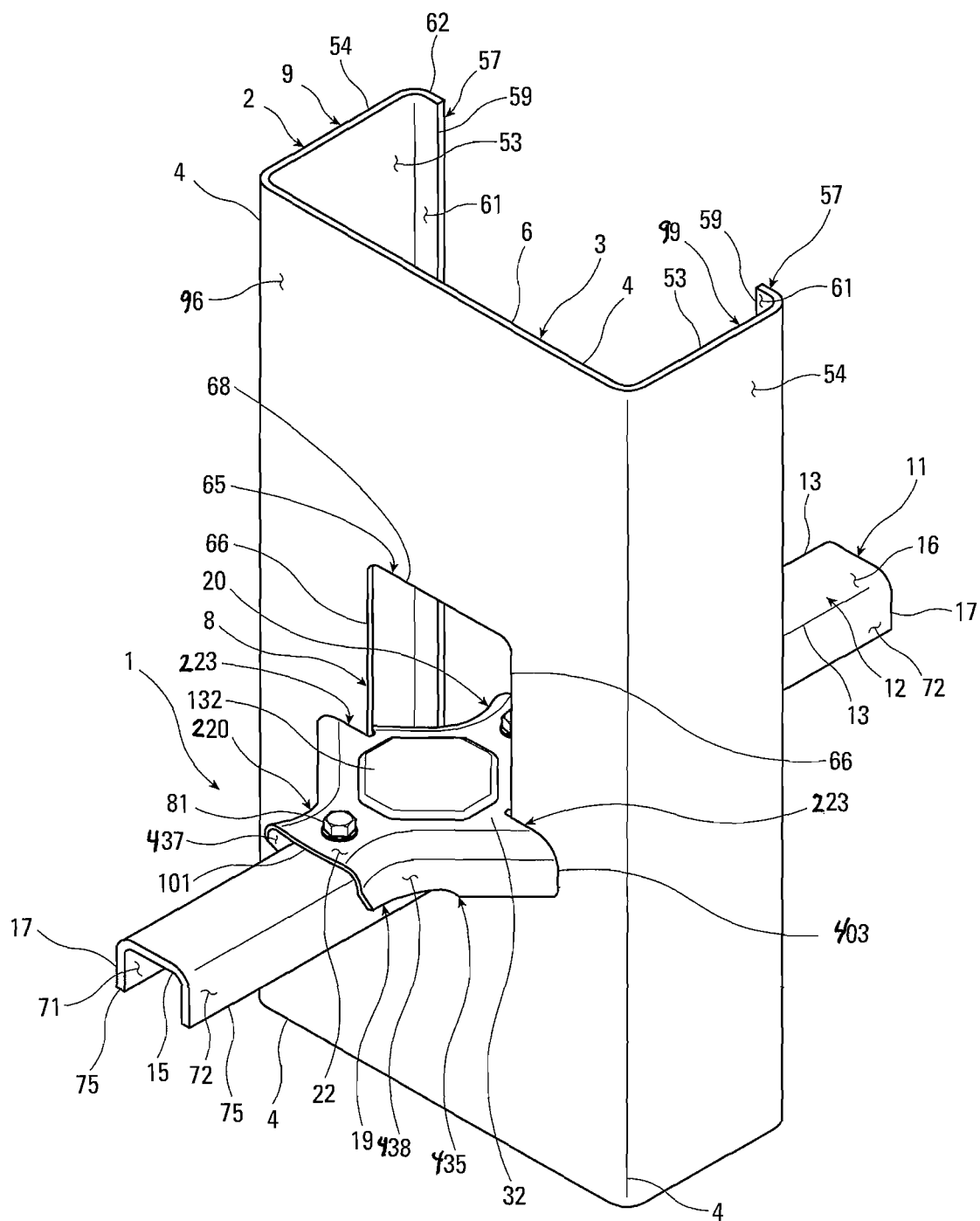
FIG. 1 is an upper front right perspective view of a connection made between a typical cold-formed steel wall stud, a typical cold-formed steel bridging member, and bridging connector formed according to the present invention.
Figure 7:
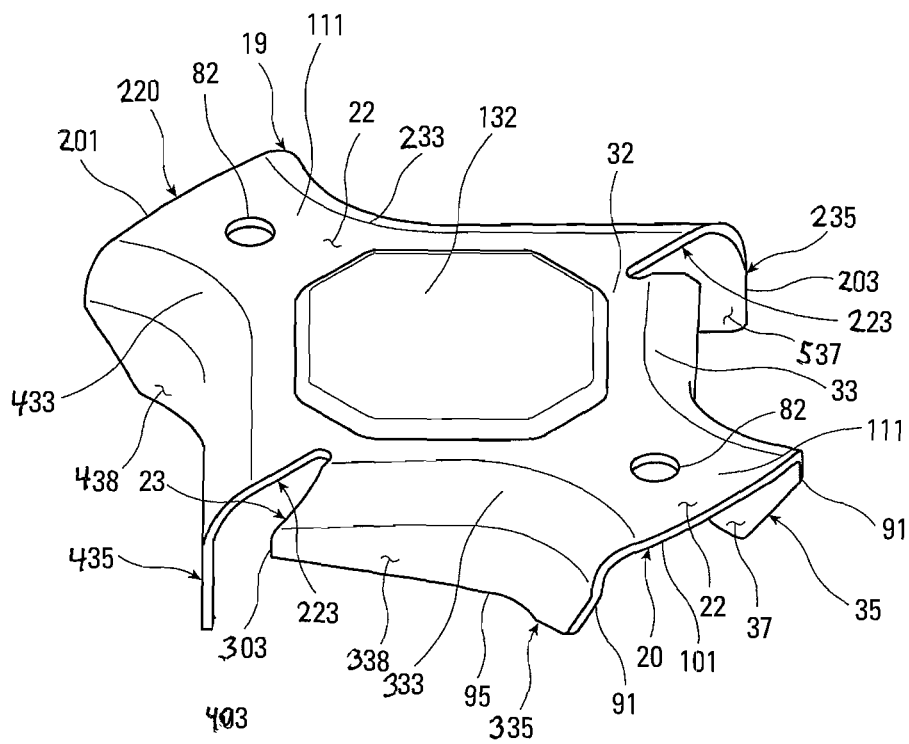
FIG. 7 is an upper rear left perspective view of the preferred form of the bridging connector of the present invention.
Figure 8:
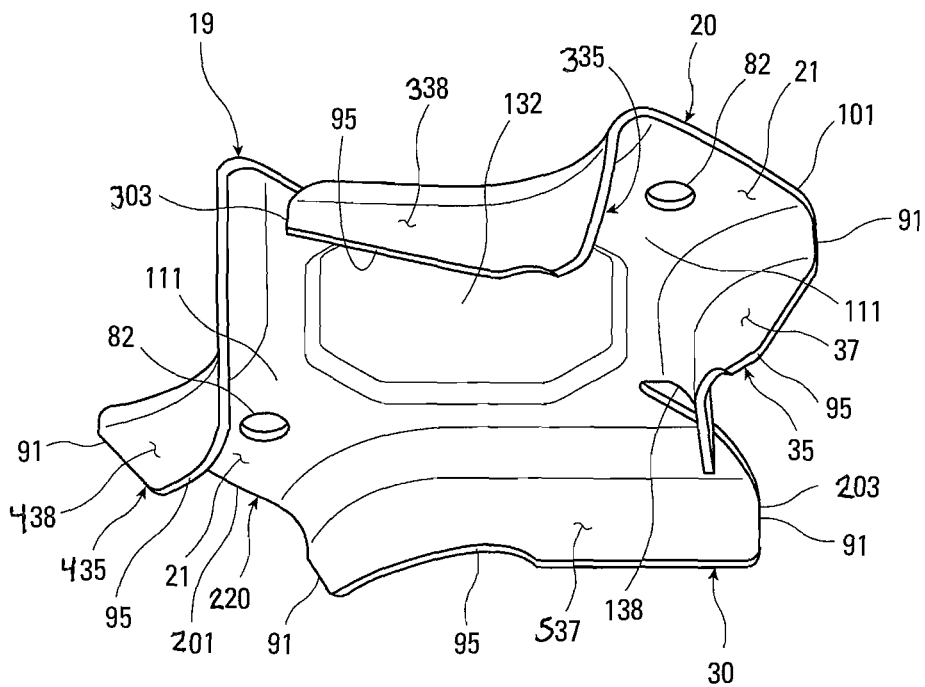
FIG. 8 is a lower rear left perspective view of the preferred form of the bridging connector of the present invention.
Figure 9:
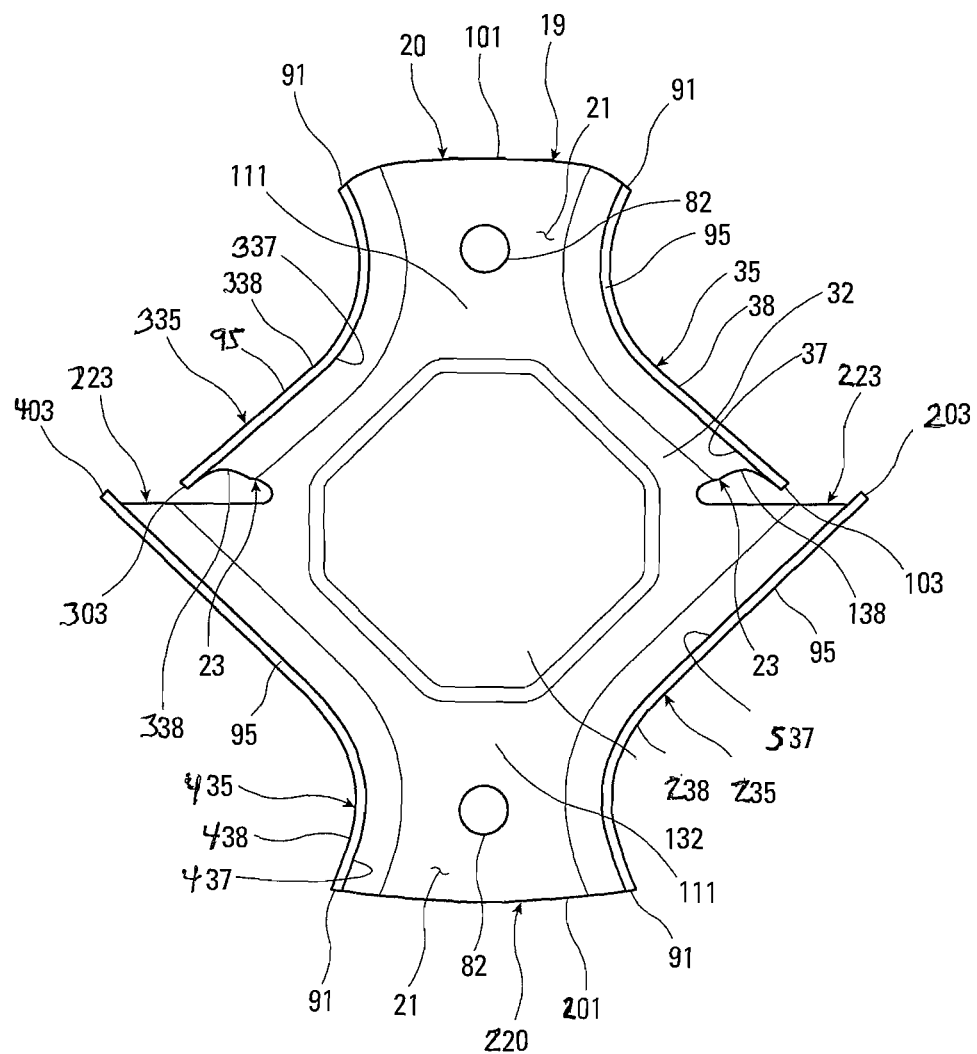
FIG. 9 is a bottom plan view of the preferred form of the bridging connector of the present invention.
Figure 10:
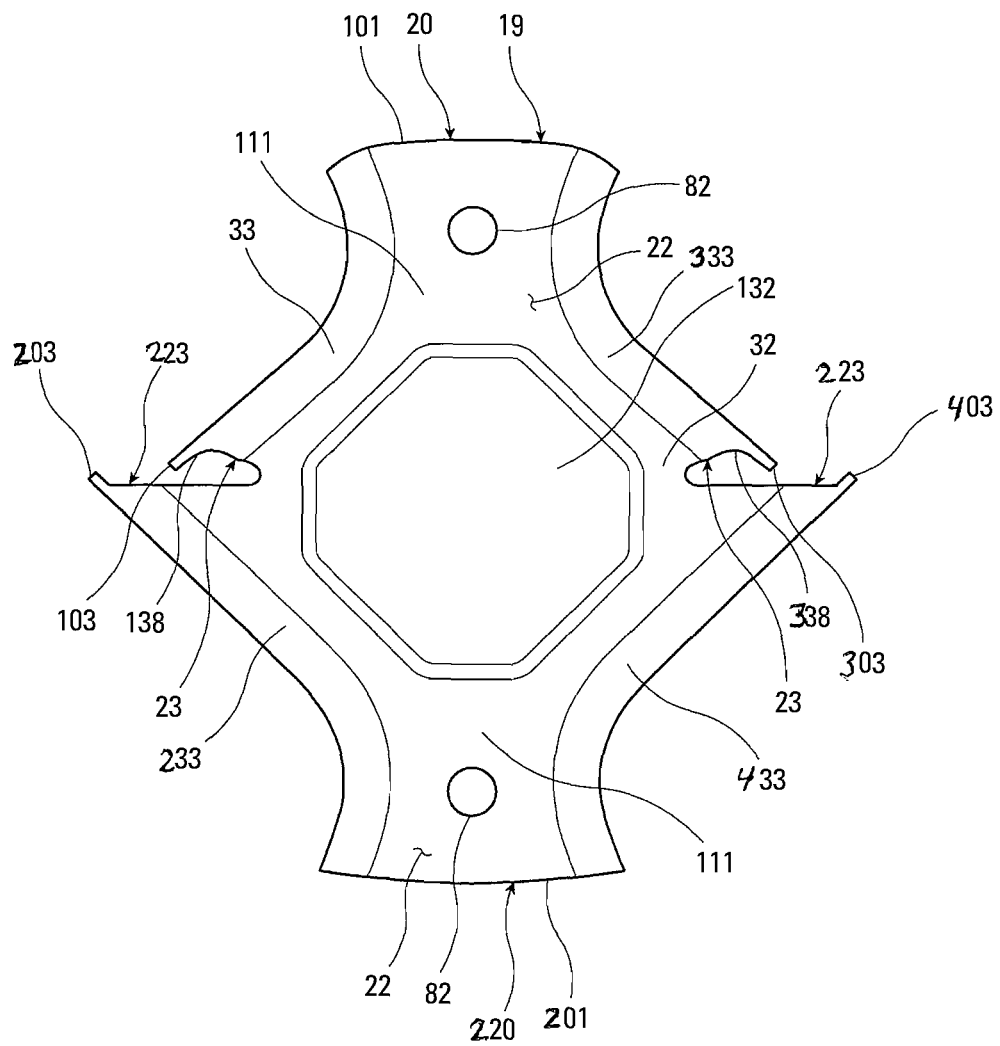
FIG. 10 is a top plan view of the preferred form of the bridging connector of the present invention.
Figure 11:
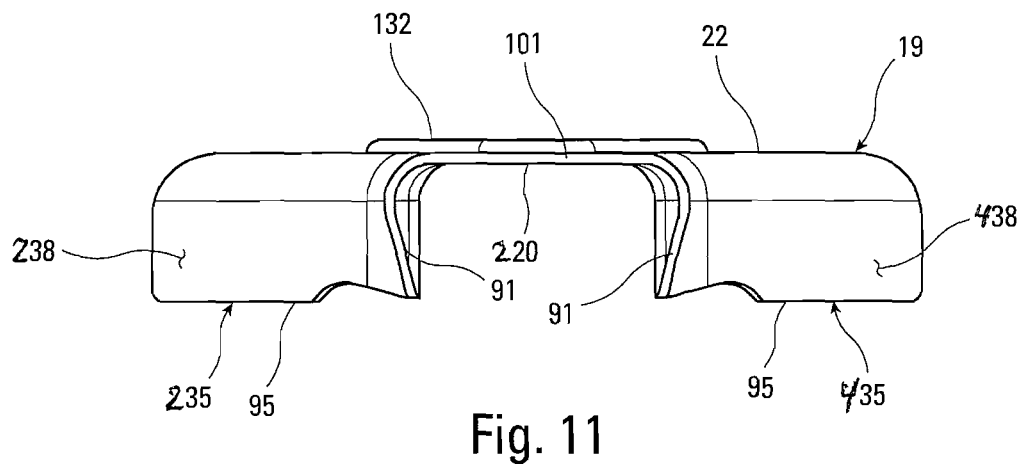
FIG. 11 is a rear elevation view of the preferred form of the bridging connector of the present invention.
Figure 12:
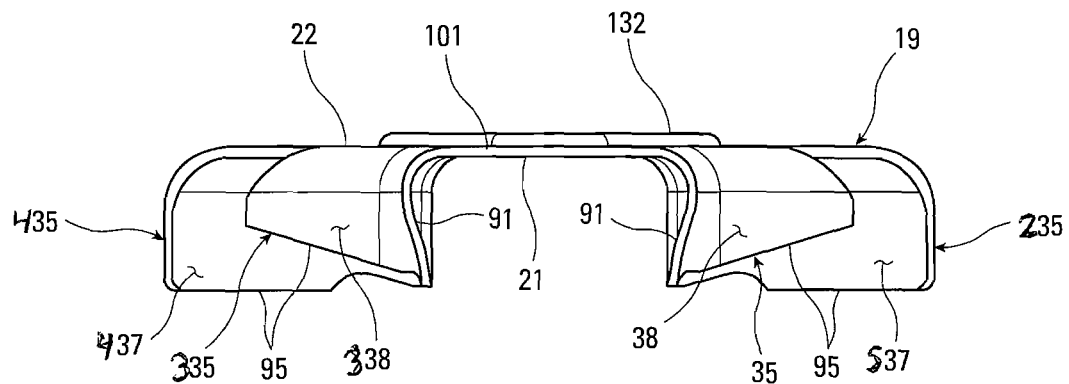
FIG. 12 is a front elevation view of the preferred form of the bridging connector of the present invention.
Figure 13:
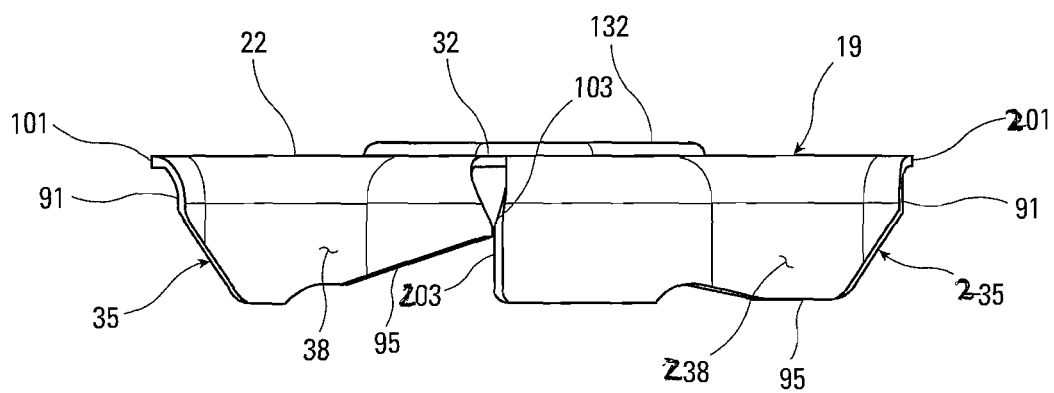
FIG. 13 is a left side elevation view of the preferred form of the bridging connector of the present invention.

As shown in FIGS. 1, 5, 6, 16 and 17, the invention is a building connection 1 between a substantially vertical wall stud 2, a substantially horizontal bridging member 11, and a bridging connector 19. The wall stud 2 is typically one of several sequentially-arranged, cold-formed steel studs 2 in the frame of a building wall. The bridging member 11 is typically a separate cold-formed steel member that interfaces with and spans a plurality of wall studs 2. The bridging connector 19 is preferably made from cold-formed steel, but it could also be cast from a material such as aluminum or fabricated in another manner and from other suitable materials.

As shown in FIGS. 1-6, 19 and 20, the substantially vertical wall stud 2 preferably has a central web 3, a first side flange 9 integrally attached to the central web 3, and a second side flange 99 integrally attached to the central web 3. The central web 3 includes an opening 8. The most common shape for the opening 8 in an interior drywall stud 2 is shown in the drawing figures. The opening is 2.5 inches in height. As shown in FIGS. 1-6, 16 and 17, the wall stud also typically has stiffening flanges 57, each of which has an inner edge 59, an inner surface 61 and an outer surface 62. The central web 3 of the wall stud 2 typically has four sides 4. The first and second side flanges 9 and 99 of the central web 3 have corresponding first and second inner surfaces 53 and first and second outer surfaces 54. The opening 8 is often vertically elongated, with an edge 65 that has first and second elongated portions 66 and first and second end portions 68.

As shown in FIGS. 1-4, the substantially horizontal bridging member 11 has an at least partially planar middle web 12, an at least partially planar first boundary flange 17, and an at least partially planar second boundary flange 17. The at least partially planar middle web 12 has a first boundary 13 and a second boundary 13, an internal surface 15 and an external surface 16. The at least partially planar first boundary flange 17 is angularly joined to and extends from the middle web 12 at the first boundary 13. The first boundary flange 17 has an internal surface 71 and an external surface 72. The at least partially planar second boundary flange 17 is angularly joined to and extends from the middle web 12 at the second boundary 13. The second boundary flange 17 has an internal surface 71 facing toward the internal surface 71 of the first boundary flange 17 and an external surface 72 facing away from the external surface 72 of the first boundary flange 17. The first and second boundary flanges 17 of the bridging member 11 have first and second outer edges 75, respectively, that are mutually parallel. In the typical drywall framing application, the middle web 12 of the bridging member 11 is 0.75 inches wide and the boundary flanges 17 are 0.5 inches tall.

As shown in FIGS. 1, 5, 6, 19 and 20, the bridging connector 19 contacts the central web 3 of the wall stud 2 and is fastened to the bridging member 11. The bridging connector 19 preferably has a first body part 20, a second body part 220, a first web-interface notch 134, and a neck 32 joining the first body part 20 to the second body part 220. The first and second body parts 20 and 220 have corresponding first and second interior surfaces 21 and first and second exterior surfaces 22.

As shown in FIGS. 1-13 and 18-20, preferably the first body part 20 has a first inner edge 23, a central portion 111, and a first side flange 35. The central portion 111 is preferably bounded at least in part by the first inner edge 23 and a first boundary bend 33. The first side flange 35 is preferably joined to the central portion 111 along the first boundary bend 33. The first side flange 35 has a first inner end edge 103 that contacts the central web 3 of the wall stud 2. The first inner end edge 103 is at least partially coincident with the first inner edge 23 of the first body part 20. Preferably, the second body part 220 has a second inner edge 223. The first side flange 35 preferably has a first outer end edge 91 and a first lower edge 95.

As shown in FIGS. 1-10, 13 and 18-20, preferably the first web-interface notch 134 has a first edge 136 at least partially coincident with a portion of the first inner edge 23 of the first body part 20. The first edge 136 extends from a first outer corner 135 to a first innermost point 137 where the first edge 136 joins a second edge 236, the first edge 136 extending from the first innermost point 137 toward the first side flange 35. The second edge 236 is at least partially coincident with a portion of the second inner edge 223 of the second body part 220. The second edge 236 extends from a second outer corner 135 to the first innermost point 137 and extending at least partially beside the second opposed side face 96 of the central web 3.

As shown in FIGS. 5, 6, 9, 10, 13 and 17, a portion of the first edge 136 preferably is at least partially coincident with the first boundary bend 33 and arcs away from the central web 3 of the wall stud 2. The first edge presents a substantially ellipsoid arc edge portion 138 that is open toward, and not in contact with, the central web 3 of the wall stud 2. This is a concave edge portion 138.

It would be difficult, if not impossible, to form web-interface notches 134 and 234 that are narrow enough to fully engage the very thin central webs 3 of interior dry wall studs 2, which are typically 0.015-0.034 inches thick. This design allows edges 136 and 236 of each web-interface notch 134 to arc away from the central web 3, following the contour of the boundary bend 33 and then extending forward to contact the central web 3 on the depending flanges 35 and 235. The flanges 35 and 235 so tightly engage the central web 3 of the wall stud 2 that the flanges 35 and 235 are slightly pushed back and the bridging connector 19 is slightly deformed. This tight engagement improves the connection 1 and its ability to resist rotation of the wall stud 2.

Preferably, the first inner end edge 103 of the first side flange 35 is at least partially coincident with a portion of the first edge 136 and the first inner end edge 103 is the only portion of the first edge 136 that contacts the central web 3 of the wall stud. Preferably, the second inner end edge 203 of the second side flange 235 is at least partially coincident with a portion of the second edge 236 and the second inner end edge 203 is the only portion of the second edge 236 that contacts the central web 3 of the wall stud. The second side flange 35 preferably has a second outer end edge 91 and a second lower edge 95.

As shown in FIGS. 5-7, 9, 10 and 18-20, preferably the bridging connector 19 also has a second web-interface notch 234 and the neck 32 joins the first body part 20 to the second body part 220 between the first and second web-interface notches 134 and 234. The second web-interface notch 234 preferably has a third edge 336 at least partially coincident with a portion of the first inner edge 23 of the first body part 20. The third edge 336 extends from a third outer corner 135 to a second innermost point 237 where the third edge 236 joins a fourth edge 436. The fourth edge 436 is at least partially coincident with a portion of the second inner edge 223 of the second body part 220. The fourth edge 436 extends from a fourth outer corner 135 to the second innermost point 237 and extending at least partially beside the second opposed side face 3 of the central web 96.

As shown in FIGS. 1-9 and 12, preferably the first body part 20 of the bridging connector 19 also has a third boundary bend 333 and a third side flange 335. The third boundary bend 333 bounds the central portion 111 of the first body part 20. The third side flange 335 is joined to the central portion 111 along the third boundary bend 333. The third side flange 335 has a third inner end edge 303 that contacts the first side face 96 of the central web 3 of the wall stud 2. The third inner end edge 303 is at least partially coincident with the first inner edge 23 of the first body part 20. The third side flange 335 preferably has a third outer end edge 91 and a third lower edge 95.

Preferably, a portion of the third edge 336 of the second web-interface notch 234 at least partially coincident with the third boundary bend 333 arcs away from the central web 3 of the wall stud 2, presenting a substantially ellipsoid arc edge portion 338 that is open toward, and not in contact with, the central web 3 of the wall stud 2.

As shown in 5-9 and 12, the second body part 220 of the bridging connector 19 also preferably has a central portion 111 and a second side flange 235. The central portion 111 is bounded at least in part by the second inner edge 223 and a second boundary bend 233. The second side flange 235 is joined to the central portion 111 along the second boundary bend 233. The second side flange 235 has a second inner end edge 203 that contacts the second opposed side face 96 of the central web 3 of the wall stud 2. The second inner end edge 203 is at least partially coincident with the second inner edge 223 of the second body part 220 and the second edge 436 extends from the first innermost point 137 toward the second side flange 235.

As shown in FIGS. 1, 5, 6, 8, 9 and 12, preferably the second body part 220 of the bridging connector 19 also has a fourth boundary bend 433 and a fourth side flange 435. The fourth boundary bend 433 bounds the central portion 111 of the second body part 220. The fourth side flange 435 is joined to the central portion 111 along the fourth boundary bend 433. The fourth side flange 435 has a fourth inner end edge 403 that contacts the second opposed side face 96 of the central web 3 of the wall stud 2. The fourth inner end edge 403 is at least partially coincident with the second inner edge 223 of the second body part 220 and the fourth edge 436 extends from the second innermost point 437 toward the fourth side flange 435. The fourth side flange 435 preferably has a fourth outer end edge 91 and a fourth lower edge 95.

Preferably, the third inner end edge 303 of the third side flange 335 is at least partially coincident with a portion of the third edge 336 and the third inner end edge 303 is the only portion of the third edge 336 that contacts the central web 3 of the wall stud. Preferably, the fourth inner end edge 403 of the fourth side flange 435 is at least partially coincident with a portion of the fourth edge 436 and the fourth inner end edge 403 is the only portion of the fourth edge 436 that contacts the central web 3 of the wall stud.

Preferably, one of the first and second inner end edges 103 and 203 on the first and second side flanges 35 and 235 of the bridging connector 19 is closer to the opening 8 in the central web 3 of the wall stud 2 than the other of the first and second inner edges 103 and 203. Preferably, one of the third and fourth inner end edges 303 and 403 on the third and fourth side flanges 335 and 435 of the bridging connector 19 is closer to the opening 8 in the central web 3 of the wall stud 2 than the other of the third and fourth inner edges 303 and 403.

As shown in FIGS. 5, 6, 19 and 20, the first side flange 35 of the bridging connector 19 preferably interfaces with the first boundary flange 17 of the bridging member 11. As shown in FIGS. 5, 6, 19 and 20, preferably the first side flange 35 of the bridging connector 19 and the first boundary flange 17 of the bridging member 11 are at least partially nonparallel. As shown in FIGS. 5, 6, 19 and 20, preferably the first side flange 35 of the bridging connector 19 has a first inner surface 37 facing the bridging member 11 and the first inner surface 37 of the first side flange 35 is curvilinear convex where the first inner surface 37 of the first side flange 35 interfaces with the first boundary flange 17 of the bridging member 11. The first side flange 35 also has a first outer surface 38 opposite the first inner surface 37.

As shown in FIGS. 5, 6, 19 and 20, the second side flange 235 of the bridging connector 19 preferably interfaces with the first boundary flange 17 of the bridging member 11. As shown in FIGS. 5, 6, 19 and 20, preferably the second side flange 235 of the bridging connector 19 and the first boundary flange 17 of the bridging member 11 are at least partially nonparallel. As shown in FIGS. 5, 6, 19 and 20, preferably the second side flange 235 of the bridging connector 19 has a second inner surface 537 facing the bridging member 11 and the second inner surface 537 of the second side flange 235 is curvilinear convex where the second inner surface 537 of the second side flange 235 interfaces with the first boundary flange 17 of the bridging member 11. The second side flange 235 also has a second outer surface 238 opposite the second inner surface 537.

As shown in FIGS. 5, 6 19 and 20, the third side flange 335 of the bridging connector 19 preferably interfaces with the second boundary flange 17 of the bridging member 11. As shown in FIGS. 5, 6, 19 and 20, preferably the third side flange 335 of the bridging connector 19 and the second boundary flange 17 of the bridging member 11 are at least partially nonparallel. As shown in FIGS. 5, 6, 19 and 20, preferably the third side flange 335 of the bridging connector 19 has a third inner surface 337 facing the bridging member 11 and the third inner surface 337 of the third side flange 335 is curvilinear convex where the third inner surface 337 of the third side flange 335 interfaces with the second boundary flange 17 of the bridging member 11. The third side flange 335 also has a third outer surface 338 opposite the third inner surface 337.

As shown in FIGS. 5, 6, 19 and 20, the fourth side flange 435 of the bridging connector 19 preferably interfaces with the second boundary flange 17 of the bridging member 11. As shown in FIGS. 5, 6, 19 and 20, preferably the fourth side flange 435 of the bridging connector 19 and the second boundary flange 17 of the bridging member 11 are at least partially nonparallel. As shown in FIGS. 5 and 6, preferably the fourth side flange 435 of the bridging connector 19 has a fourth inner surface 437 facing the bridging member 11 and the fourth inner surface 437 of the fourth side flange 435 is curvilinear convex where the fourth inner surface 437 of the fourth side flange 435 interfaces with the second boundary flange 17 of the bridging member 11. The fourth side flange 435 also has a fourth outer surface 438 opposite the fourth inner surface 437.

As shown in FIG. 4, the bridging connector 19 is preferably fastened to the bridging member 11 with only a single fastener 81, but can be fastened to the bridging member with two or more fasteners 81. The bridging connector 19 can also be formed to allow it to be fastened to the wall stud 2.

As shown in FIGS. 1-13 and 18-20, preferably the first body part 20 of the bridging connector 19 is embossed for increased stiffness. The second body part 220 is preferably embossed for increased stiffness. Preferably, the first body part 20 and the second body part 220 share a single stiffening embossment 132. Most preferably, the single stiffening embossment 132 is octagonal. The stiffening embossment 132 allows the bridging connector 19 to be made from exceptionally light, 20-gauge, sheet metal; without the stiffening embossment 132, the bridging connector 19 would have to be made from 18-gauge sheet metal, which is substantially thicker and requires more force, and therefore energy, to form. Preferably, the stiffening embossment 132 is a regular octagon oriented so that it has opposed sides parallel to the longitudinal axis of the bridging member 11.

Figure 14:
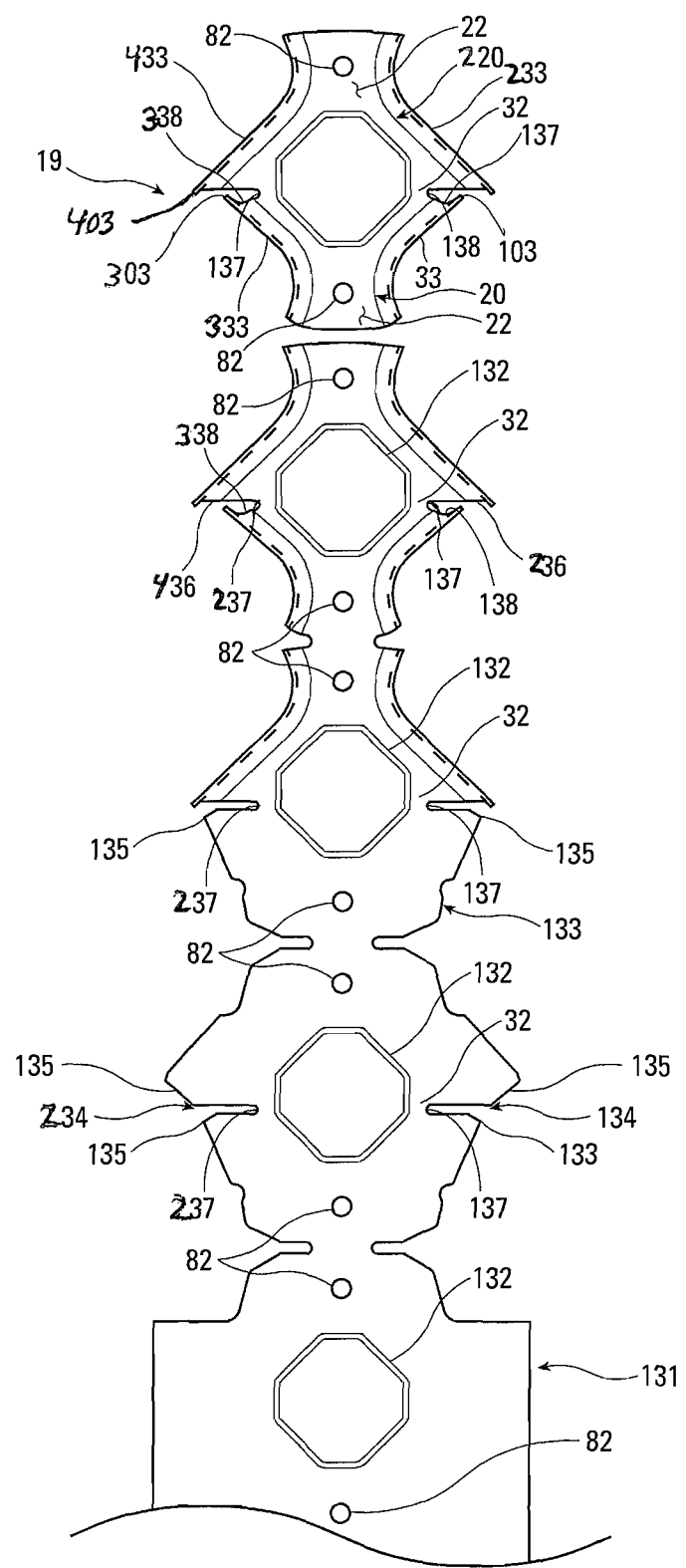
FIG. 14 is a top plan view of the progressive die forming stages of the bridging connector of the present invention.
Figure 15:
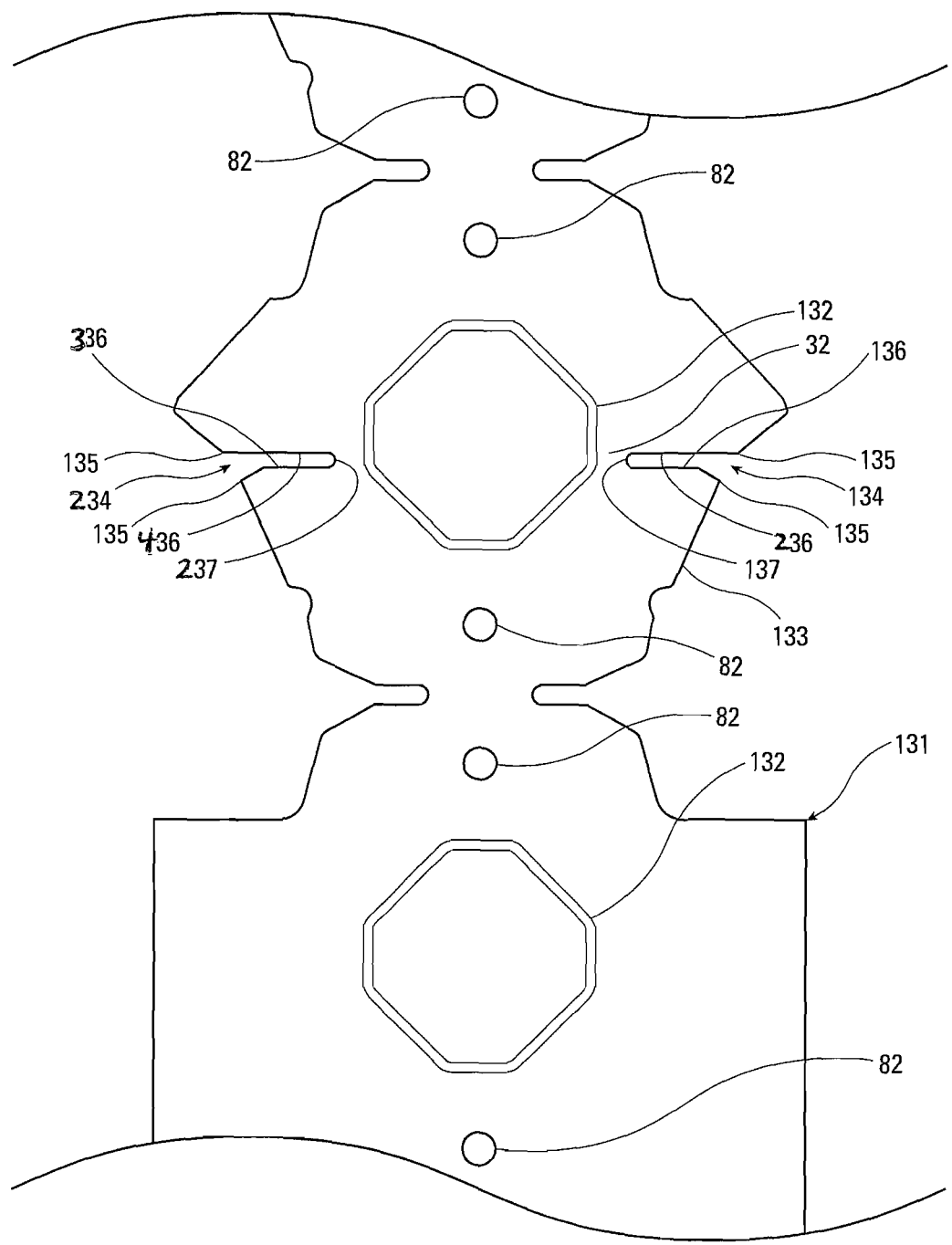
FIG. 15 is a top plan view of the first progressive die forming stages of the bridging connector of the present invention.

As shown in FIGS. 14 and 15, the bridging connector 19 of the present invention is preferably formed by first selecting a sheet metal blank 131, and then cutting the outer edge contour 133 of the bridging connector 19.

As shown in FIGS. 14 and 15, preferably the outer edge contour 133 includes a first elongated web-interface notch 134, a first body part 20 and a second body part 220 joined by a neck 32.

As shown in FIGS. 14 and 15, the first elongated web-interface notch 134 preferably has a first outer corner 135, a first edge 136 that extends from the first outer corner 135 to a first innermost point 137, and a second edge 236 that extends from the innermost point 137 to a second outer corner 135. The greater part of the first edge 136 and the greater part of the second edge 236 are mutually parallel.

As shown in FIGS. 14 and 15, preferably the first body part 20 has a central portion 111 bounded by a first inner edge 23 at least partially coincident with the first edge 136 of the first elongated web-interface notch 134. The second body part 220 preferably has a central portion 111 bounded by a second inner edge 223 at least partially coincident with the second edge 236 of the first elongated web-interface notch 134.

Figure 16:
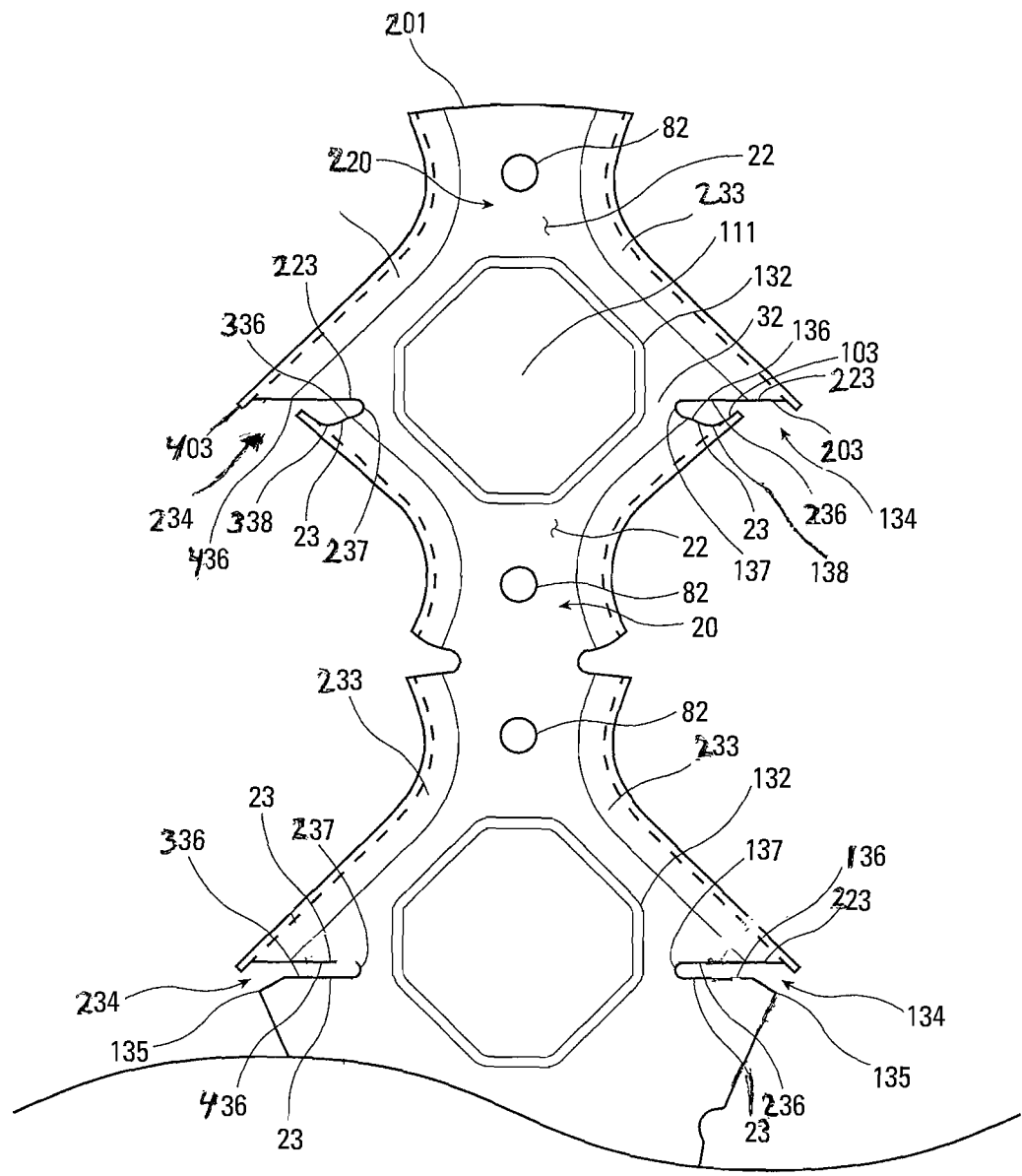
FIG. 16 is a top plan view of the middle progressive die forming stages of the bridging connector of the present invention.

As shown in FIGS. 14 and 16, the next step in forming the bridging connector 19 preferably is bending down a first portion of the first body part 20 to form a first boundary bend 33 and a first side flange 35 joined to the central portion 111 of the first body part 20 along the first boundary bend 33.

As shown in FIGS. 14-17, preferably a portion of the first edge 136 of the first elongated web-interface notch 134 at least partially coincident with the first boundary bend 33 arcs away from the second edge 236 of the first elongated web-interface notch 134. This presents a substantially ellipsoid arc edge portion 138 that is open toward the second edge 236 of the first elongated web-interface notch 134. This is a concave edge portion 138.

As shown in FIGS. 14-17, the method preferably includes the step of embossing a central stiffening embossment 132.

As shown in FIGS. 14-17, preferably the method includes the step of punching one or more fastener openings 82 in the sheet metal blank 131.

As shown in FIGS. 14-17, the method preferably includes the step of forming a second elongated web-interface notch 234 in the outer contour 133 of the bridging connector 19. The second elongated web-interface notch 234 has a third outer corner 135, a third edge 336 that extends from the third outer corner 135 to a second innermost point 237, a fourth edge 436 that extends from the second innermost point 237 to a fourth outer corner 135, wherein the greater part of the third edge 336 and the greater part of the fourth edge 436 are mutually parallel. The web interface notches 134 and 234 are wider than the central web 3 of the wall stud because the central webs 3 of drywall wall studs 2 are so thin (typically 0.015 inches to 0.034 inches) that it would be impractical, if not impossible, to cut slots that narrow using automated die presses.

As shown in FIGS. 14-17, preferably the method includes the step of forming the neck 32 between the first elongated web-interface notch 134 and the second elongated web-interface notch 234.

Figure 17:
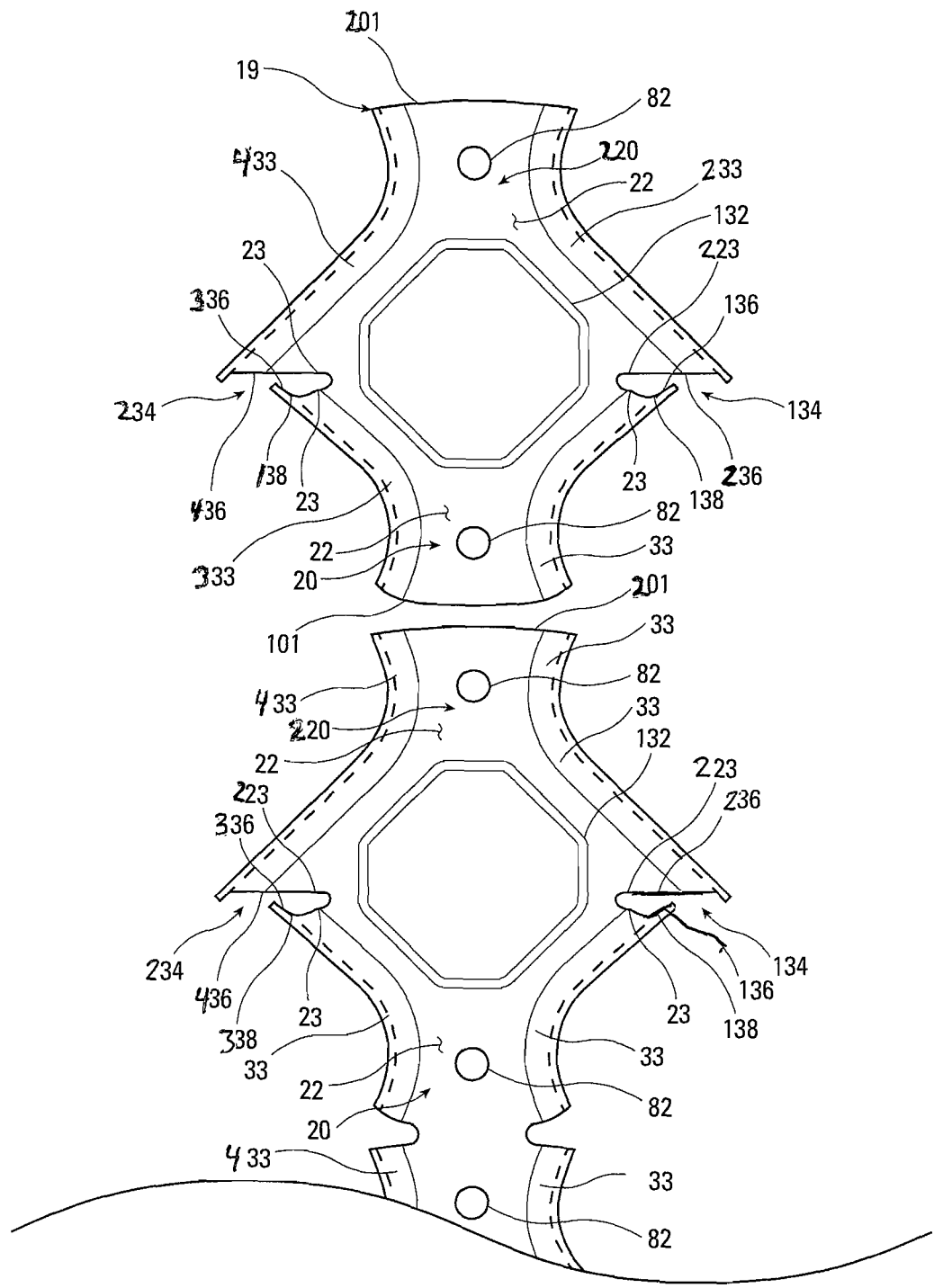
FIG. 17 is a top plan view of the last progressive die forming stages of the bridging connector of the present invention.

As shown in FIGS. 14, 16 and 17, the method preferably includes the step of bending down a second portion of the first body part 20 to form a third boundary bend 333 and a third side flange 335 joined to the central portion 111 of the first body part 20 along the third boundary bend 333. A portion of the third edge 336 of the second elongated web-interface notch 234 at least partially coincident with the third boundary bend 333 arcs away from the fourth edge 436 of the second elongated web-interface notch 234. This presents a substantially ellipsoid arc edge portion 338 that is open toward the fourth edge 436 of the second elongated web-interface notch 234. This is a concave edge portion 238.

As shown in FIGS. 14, 16 and 17, preferably the method includes the step of bending down a first portion of the second body part 220 to form a second boundary bend 233 and a second side flange 235 joined to the central portion 111 of the second body part 220 along the second boundary bend 233.

As shown in FIGS. 14, 16 and 17, the method preferably includes the step of bending down a second portion of the second body part 220 to form a fourth boundary bend 433 and a fourth side flange 435 joined to the central portion 111 of the second body part 220 along the fourth boundary bend 433.

As shown in FIGS. 19 and 20, in an alternate preferred embodiment, the invention is building connection 1 that includes a substantially vertical wall stud 2, a substantially horizontal bridging member 11, and a bridging connector 19 contacting the central web 3 of the wall stud 2 and fastened to the bridging member 11.

As shown in FIGS. 19 and 20, the substantially vertical wall stud 2 preferably has a central web 3 having an opening 8, a first side flange 9 integrally attached to the central web 3, and a second side flange 99 integrally attached to the central web 3.

As shown in FIGS. 19 and 20, the substantially horizontal bridging member 11 preferably has an at least partially planar middle web 12, an at least partially planar first boundary flange 17, and an at least partially planar second boundary flange 17. Preferably, the at least partially planar middle web 12 has a first boundary 13 and a second boundary 13, an internal surface 15 and an external surface 16. Preferably, the at least partially planar first boundary flange 17 is angularly joined to and extends from the middle web 12 at the first boundary 13. The first boundary flange 17 has an internal surface 71 and an external surface 72. Preferably, the at least partially planar second boundary flange 17 is angularly joined to and extends from the middle web 12 at the second boundary 13. The second boundary flange 17 has an internal surface 71 facing toward the internal surface 71 of the first boundary flange 17 and an external surface 72 facing away from the external surface 72 of the first boundary flange 17. Preferably, the first and second boundary flanges 17 of the bridging member 11 have first and second outer edges 75, respectively, that are mutually parallel.

Figure 18:
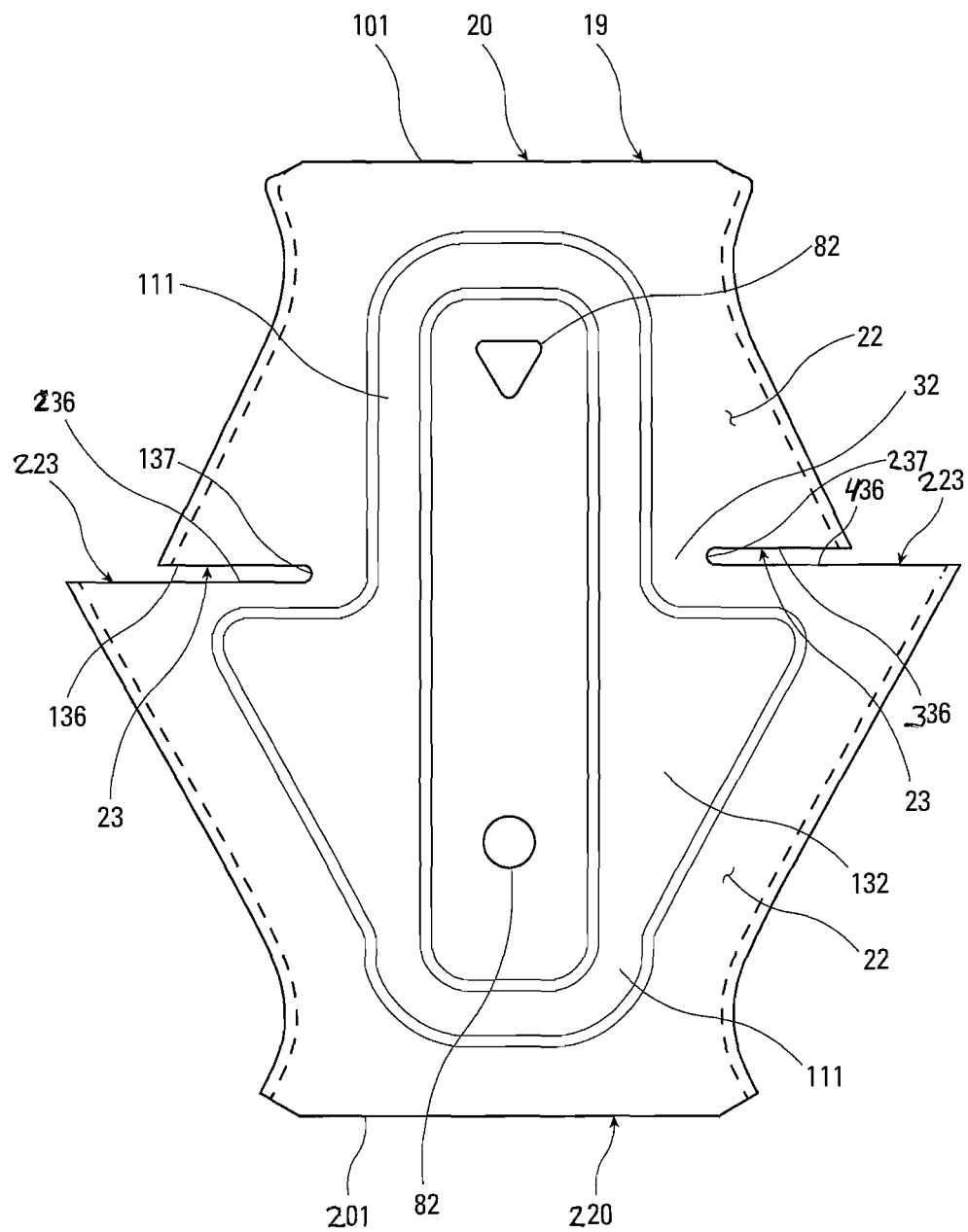
FIG. 18 is a top plan view of the an alternate preferred form of the bridging connector of the present invention.

As shown in FIGS. 18-20, the bridging connector 19 preferably has a first body part 20, a second body part 220, a first web-interface notch 134, a second web-interface notch 234, and a neck 32 that joins the first body part 20 to the second body part 220 between the first and second web-interface notches 134 and 234.

As shown in FIGS. 18-20, the first body part preferably has a first inner edge 23 and a first outer edge 101, a central portion 111 bounded at least in part by the first inner edge 23 and a first boundary bend 33, and a first side flange 35 joined to the central portion 111 along the first boundary bend 33. The first side flange 35 has a first inner end edge 103 that contacts the central web 3 of the wall stud 2. The first inner end edge 103 is at least partially coincident with the first inner edge 23 of the first body part 20.

As shown in FIGS. 18-20, the second body part 220 preferably has a second inner edge 223 and a second outer edge 201.

As shown in FIGS. 18-20, preferably the first web-interface notch 134 has a first edge 136 at least partially coincident with a portion of the first inner edge 23 of the first body part 20. The first edge 136 extends from a first outer corner 135 to a first innermost point 137 where the first edge 136 joins a second edge 236. The second edge 236 is at least partially coincident with a portion of the second inner edge 223 of the second body part 20. The second edge 236 extends from a second outer corner 135 to the first innermost point 137.

As shown in FIGS. 18-20, the second web-interface notch 234 preferably has a third edge 336 at least partially coincident with a portion of the first inner edge 23 of the first body part 20. The third edge 336 extends from a third outer corner 135 to a second innermost point 237 where the third edge 336 joins a fourth edge 436. The fourth edge 436 is at least partially coincident with a portion of the second inner edge 223 of the second body part 220. The fourth edge 436 extends from a fourth outer corner 135 to the second innermost point 237.

As shown in FIGS. 18-20, preferably, the first and second web-interface notches 134 and 234 are longitudinally offset so that the first web-interface notch 134 is closer to the first outer edge 101 than the second web-interface notch 234 is, and the second web-interface notch 234 is closer to the second outer edge 201 than the first web-interface notch 134, so that the central web 3 of the substantially vertical wall stud 2 is held by the first and second web-interface notches 134 and 234 with increased frictional engagement.

We claim:
1. A building connection (1) comprising:
   a. a substantially vertical wall stud (2) having:
      i. a central web (3) having an opening (8) a first side face (6) and second opposed side face (96);
      ii. a first side flange (9) integrally attached to the central web (3); and
      iii. a second side flange (99) integrally attached to the central web (3);

b. a substantially horizontal channel-shaped bridging member (11) passing through the opening (8) in the central web (3) of the wall stud (2);
c. a bridging connector (19) contacting the central web (3) of the wall stud (2) and fastened to the bridging member (11), the bridging connector (19) comprising:
 i. a first body part (20) having:
  (a) a first inner edge (23);
  (b) a central portion (111) bounded at least in part by first inner edge (23) and a first boundary bend (33); and
  (c) a first side flange (35) joined to the central portion (111) along the first boundary bend (33), the first side flange (35) having a first inner end edge (103) that contacts the first side face (6) of the central web (3) of the wall stud (2), the first inner end edge (103) being at least partially coincident with the first inner edge (23) of the first body part (20);
 ii. a second body part (220) having a second inner edge (223);
 iii. a first web-interface notch (134) having a first edge (136) at least partially coincident with a portion of the first inner edge (23) of the first body part (20), the first edge (136) extending from a first innermost point (137) where the first edge (136) joins a second edge (236), the first edge (136) extending from the first innermost point (137) toward the first side flange (35), the second edge (236) being at least partially coincident with a portion of the second inner edge (223) of the second body part (220), the second edge (236) extending from the first innermost point (137) and extending at least partially beside the second opposed side face (96) of the central web (3); wherein:
  (a) a portion of the first edge (136) arcs away from the central web (3) of the wall stud (2), presenting a substantially ellipsoid arc edge portion (138) that is open toward, and not in contact with, the central web (3) of the wall stud (2);
 iv. a neck (32) joining the first body part (20) to the second body part (220).

2. The building connection (1) of claim 1 wherein:
a. the substantially ellipsoid arc edge portion (138) is at least partially coincident with the first boundary bend (33).

3. The building connection (1) of claim 1 wherein the bridging connector (19) additionally comprises:
a. a second web-interface notch (234) having a third edge (336) at least partially coincident with a portion of the first inner edge (23) of the first body part (20), the third edge (236) extending from a second innermost point (237) where the third edge (236) joins a fourth edge (436), the fourth edge (436) being at least partially coincident with a portion of the second inner edge (223) of the second body part (220), the fourth edge (436) extending from the second innermost point (237) and extending at last partially beside the second opposed side face (96) of the central web (3), and wherein:
 i. the neck (32) joins the first body part (20) to the second body part (220) between the first and second web-interface notches (134 and 234).

4. The building connection (1) of claim 3 wherein the first body part (20) of the bridging connector (19) additionally comprises:
a. a third boundary bend (333) bounding the central portion (111) of the first body part (20), and a third side flange (335) joined to the central portion (111) along the third boundary bend (333), the third side flange (335) having a third inner end edge (303) that contacts the first side face (6) of the central web (3) of the wall stud (2), the third inner end edge (303) being at least partially coincident with the first inner edge (23) of the first body part (20).

5. The building connection (1) of claim 4 wherein:
a. a portion of the third edge (336) of the second web-interface notch (234) arcs away from the central web (3) of the wall stud (2), presenting a substantially ellipsoid arc edge portion (338) that is open toward, and not in contact with, the central web (3) of the wall stud (2).

6. The building connection (1) of claim 5 wherein:
a. the substantially ellipsoid arc edge portion (338) of the third edge (336) is at least partially coincident with the third boundary bend (333).

7. The building connection (1) of claim 1 wherein:
a. the second body part (220) of the bridging connector (19) additionally comprises:
 i. a central portion (111) bounded at least in part by the second inner edge (223) and a second boundary bend (233); and
 ii. a second side flange (235) joined to the central portion (111) along the second boundary bend (233), the second side flange (235) having a second inner end edge (203) that contacts the second opposed side face (96) of the central web (3) of the wall stud (2), the second inner end edge (203) being at least partially coincident with the second inner edge (223) of the second body part (220), and the second edge (236) extending from the first innermost point (137) toward the second side flange (235).

8. The building connection (1) of claim 7 wherein:
a. the first inner end edge (103) of the first side flange (35) is at least partially coincident with a portion of the first edge (136) and the first inner end edge (103) is the only portion of the first edge (136) that contacts the central web (3) of the wall stud (2); and
b. the second inner end edge (203) of the second side flange (235) is at least partially coincident with a portion of the second edge (236) and the second inner end edge (203) is the only portion of the second edge (236) that contacts the central web (3) of the wall stud (2).

9. The building connection (1) of claim 8 wherein:
a. the second body part (220) of the bridging connector (19) additionally comprises a fourth boundary bend (433) bounding the central portion (111) of the second body part (220), and a fourth side flange (435) joined to the central portion (111) along the fourth boundary bend (433), the fourth side flange (435) having a fourth inner end edge (403) that contacts the second opposed side face (96) of the central web (3) of the wall stud (2), the fourth inner end edge (403) being at least partially coincident with the second inner edge (223) of the second body part (220) and the fourth edge (436) extending from the second innermost point (237) toward the fourth side flange (435); and
b. the first body part (20) of the bridging connector (19) additionally includes:
 i. a third boundary bend 333 bounding the central portion (111) of the first body part (20), and a third side flange 335 joined to the central portion (111) along the third boundary bend (333), the third side flange (335) having a third inner end edge (303) that contacts the first side face (6) of the central web (3) of the wall stud (2), the third inner end edge (303) being at least partially coincident with the first inner edge (23) of the first body part (20); and wherein c. the bridging connector (19) additionally includes:
   i. a second web-interface notch (234) having a third edge (336) at least partially coincident with a portion of the first inner edge (23) of the first body part (20), the third edge (236) extending from a second innermost point (237) where the third edge (236) joins a fourth edge (436), the fourth edge (436) being at least partially coincident with a portion of the second inner edge (223) of the second body part (220), the fourth edge (436) extending from the second innermost point (237) and extending at last partially beside the second opposed side face (96) of the central web (3), and wherein;
   ii. the neck (32) joins the first body part (20) to the second body part (220) between the first and second web-interface notches (134 and 234).

10. The building connection (1) of claim 9 wherein:
a. the third inner end edge (303) of the third side flange (335) is at least partially coincident with a portion of the third edge (336) and the third inner end edge (303) is the only portion of the third edge (336) that contacts the central web (3) of the wall stud (2); and
b. the fourth inner end edge (403) of the fourth side flange (435) is at least partially coincident with a portion of the fourth edge (436) and the fourth inner end edge (403) is the only portion of the fourth edge (436) that contacts the central web (3) of the wall stud (2).

11. The building connection (1) of claim 10 wherein:
a. one of the first and second inner end edges (103) on the first and second side flanges (35) of the bridging connector (19) is closer to the opening (8) in the central web (3) of the wall stud (2) than the other of the first and second inner edges (103).

12. The building connection (1) of claim 11 wherein:
a. one of the third and fourth inner end edges (103 and 403) on the third and fourth side flanges (35 and 435) of the bridging connector (19) is closer to the opening (8) in the central web (3) of the wall stud (2) than the other of the third and fourth inner end edges (103 and 403).

13. The building connection (1) of claim 9 wherein:
a. the first side flange (35) of the bridging connector (19) interfaces with the bridging member (11);
b. the second side flange (235) of the bridging connector (19) interfaces with the bridging member (11);
c. the third side flange (335) of the bridging connector (19) interfaces with the bridging member (11); and
d. the fourth side flange (435) of the bridging connector (19) interfaces with the bridging member (11).

14. The building connection (1) of claim 13 wherein:
a. the first side flange (35) of the bridging connector (19) and the bridging member (11) are at least partially nonparallel;
b. the second side flange (235) of the bridging connector (19) and the bridging member (11) are at least partially nonparallel;
c. the third side flange (335) of the bridging connector (19) and the bridging member (11) are at least partially nonparallel; and
d. the fourth side flange (435) of the bridging connector (19) and the bridging member (11) are at least partially nonparallel.

15. The building connection (1) of claim 14 wherein:
a. the first side flange (35) of the bridging connector (19) has a first inner surface (37) facing the bridging member (11) and the first inner surface (37) of the first side flange (35) is curvilinear convex where the first inner surface (37) of the first side flange (35) interfaces with the bridging member (11);
b. the second side flange (235) of the bridging connector (19) has a second inner surface (537) facing the bridging member (11) and the second inner surface (537) of the second side flange (235) is curvilinear convex where the second inner surface (537) of the second side flange (235) interfaces with the bridging member (11);
c. the third side flange (335) of the bridging connector (19) has a third inner surface (337) facing the bridging member (11) and the third inner surface (337) of the third side flange (335) is curvilinear convex where the third inner surface (337) of the third side flange (335) interfaces with the bridging member (11); and
d. the fourth side flange (435) of the bridging connector (19) has a fourth inner surface (437) facing the bridging member (11) and the fourth inner surface (437) of the fourth side flange (435) is curvilinear convex where the fourth inner surface (437) of the fourth side flange (435) interfaces with the bridging member (11).

16. The building connection (1) of claim 1 wherein the bridging connector (19) is fastened to the bridging member (11) with only a single fastener (81).

17. The building connection (1) of claim 1 wherein the first body part (20) and the second body part (220) share a single stiffening embossment (132).

18. The building connection of claim 17 wherein the single stiffening embossment (132) is octagonal.

19. A method of forming a bridging connector, the method comprising:
a. selecting a sheet metal blank (131);
b. substantially cutting the outer edge contour (133) of the bridging connector (19), the outer contour (133) including:
   i. a first elongated web-interface notch (134), the first elongated web-interface notch (134) having:
      (a) a first edge (136) that extends from a first innermost point (137), a second edge (236) that extends from the innermost point (137), wherein the greater part of the first edge (136) and the greater part of the second edge 236 are mutually parallel;
   ii. a first body part (20) and a second body part (220) joined by a neck (32), wherein:
      (a) the first body part (20) has a central portion (111) bounded by a first inner edge (23) at least partially coincident with the first edge (136) of the first elongated web-interface notch (134);
      (b) the second body part (20) has a central portion (111) bounded by a second inner edge (223) at least partially coincident with the second edge (236) of the first elongated web-interface notch (134);
c. bending down a first portion of the first body part (20) to form a first boundary bend (33) and a first side flange (35) joined to the central portion (111) of the first body part (20) along the first boundary bend (33), wherein:
   i. a portion of the first edge (136) of the first elongated web-interface notch (134) at least partially coincident with the first boundary bend (33) arcs away from the second edge (236) of the first elongated web-interface notch (134), presenting a substantially ellipsoid arc edge portion (138) that is open toward the second edge (236) of the first elongated web-interface notch (134) such that the greater part of the first edge (136) and the greater part of the second edge (236) are no longer mutually parallel.

20. The method of claim 19 additionally comprising the step of embossing a central stiffening embossment (132).

21. The method of claim 19 additionally comprising the step of punching one or more fastener openings (82) in the sheet metal blank (131).

22. The method of claim 19 additionally comprising the step of forming a second elongated web-interface notch (134) in the outer contour (133) of the bridging connector (19), the second elongated web-interface notch (234) having:
   a. a third edge (236) that extends from a second innermost point (237), a fourth edge (436) that extends from the second innermost point (237), wherein the greater part of the third edge (336) and the greater part of the fourth edge (436) are mutually parallel.

23. The method of claim 22 additionally comprising the step of forming the neck (32) between the first elongated web-interface notch (134) and the second elongated web-interface notch (234).

24. The method of claim 23 additionally comprising the step of bending down a second portion of the first body part (20) to form a third boundary bend (333) and a third side flange (335) joined to the central portion (111) of the first body part (20) along the third boundary bend (333), wherein:
   i. a portion of the third edge (336) of the second elongated web-interface notch (234) at least partially coincident with the third boundary bend (333) arcs away from the fourth edge (436) of the second elongated web-interface notch (234), presenting a substantially ellipsoid arc edge portion (338) of the third edge (336) that is open toward the fourth edge (436) of the second elongated web-interface notch (234).

25. The method of claim 24 additionally comprising the step of bending down a first portion of the second body part (220) to form a second boundary bend (233) and a second side flange (235) joined to the central portion (111) of the second body part (220) along the second boundary bend (233).

26. The method of claim 25 additionally comprising the step of bending down a second portion of the second body part (220) to form a fourth boundary bend (433) and a fourth side flange (435) joined to the central portion (111) of the second body part (220) along the fourth boundary bend (433).

27. A building connection (1) comprising:
   a. a substantially vertical wall stud (2) having:
      i. a central web (3) having an opening (8), a first side face (6) and a second opposed side face (96);
      ii. a first side flange (9) integrally attached to the central web (3); and
      iii. a second side flange (99) integrally attached to the central web (3);
   b. a substantially horizontal channel-shaped bridging member (11) passing through the opening (8) in the central web (3) of the wall stud (2);
   c. a bridging connector (19) contacting the central web (3) of the wall stud (2) and fastened to the bridging member (11), the bridging connector (19) comprising:
      i. a first body part (20) having:
         (a) a first inner edge (23);
         (b) a central portion (111) bounded at least in part by the first inner edge (23) and a first boundary bend (33); and
         (c) a first side flange (35) joined to the central portion (111) along the first boundary bend (33), the first side flange (35) having a first inner end edge (103) that contacts the first side face (6) of the central web (3) of the wall stud (2), the first inner end edge (103) being at least partially coincident with the first inner edge (23) of the first body part (20);
      ii. a second body part (220) having:
         (a) a second inner edge (223);
         (b) a central portion (111) bounded at least in part by the second inner edge (223) and a second boundary bend (233); and
         (c) a second side flange (235) joined to the central portion (111) along the second boundary bend (233), the second side flange (235) having a second inner end edge (203) that contacts the central web (3) of the wall stud (2), the second inner end edge (203) being at least partially coincident with the second inner edge (223) of the second body part (220);
      iii. a first web-interface notch (134) having a first edge (136) at least partially coincident with a portion of the first inner edge (23) of the first body part (20), the first edge (136) extending from a first innermost point (137) where the first edge (136) joins a second edge (236), the first edge (136) extending from the first innermost point (137) toward the first side flange (35), the second edge (236) being at least partially coincident with a portion of the second inner edge (223) of the second body part (220), the second edge (236) extending from the first innermost point (137) and extending at least partially beside the second opposed side face (96) of the central web (3); wherein:
         (a) a portion of the first edge (136) arcs away from the central web (3) of the wall stud (2), presenting a substantially ellipsoid arc edge portion (138) that is open toward, and not in contact with, the central web (3) of the wall stud (2);
         (b) the first inner end edge (103) of the first side flange (35) is at least partially coincident with a portion of the first edge (136) and the first inner end edge (103) is the only portion of the first edge (136) that contacts the central web (3) of the wall stud; and
         (c) the second inner end edge (203) of the second side flange (235) is at least partially coincident with a portion of the second edge (236) and the second inner end edge (203) is the only portion of the second edge (236) that contacts the central web (3) of the wall stud (2);
      iv. a neck (32) joining the first body part (20) to the second body part (220).

28. The building connection (1) of claim 27 wherein:
a. the substantially ellipsoid arc edge portion (138) is at least partially coincident with the first boundary bend (33).

29. The building connection (1) of claim 27 wherein the bridging connector (19) additionally comprises:
  a. a second web-interface notch (234) having a third edge (336) at least partially coincident with a portion of the first inner edge (23) of the first body part (20), the third edge (336) extending from a second innermost point (237) where the third edge (336) joins a fourth edge (436), the fourth edge (436) being at least partially coincident with a portion of the second inner edge (223) of the second body part (220), the fourth edge (436) extending from the second innermost point (237), and wherein:
    i. the neck (32) joins the first body part (20) to the second body part (220) between the first and second web-interface notches (134 and 234).

30. The building connection (1) of claim 29 wherein the first body part (20) of the bridging connector (19) additionally comprises a third boundary bend (333) bounding the central portion (111) of the first body part (20), and a third side flange (335) joined to the central portion (111) along the third boundary bend (333), the third side flange (335) having a third inner end edge (303) that contacts the central web (3) of the wall stud (2), the third inner end edge (303) being at least partially coincident with the first inner edge (23) of the first body part (20).

31. The building connection (1) of claim 30 wherein:
  a. a portion of the third edge (336) of the second web-interface notch (234) arcs away from the central web (3) of the wall stud (2), presenting a substantially ellipsoid arc edge portion (338) that is open toward, and not in contact with, the central web (3) of the wall stud (2).

32. The building connection (1) of claim 31 wherein:
  a. the substantially ellipsoid arc edge portion (338) of the third edge (336) is at least partially coincident with the third boundary bend (333).

33. The building connection (1) of claim 31 wherein:
  a. the second body part (2200 of the bridging connector (19) additionally comprises a fourth boundary bend (433) bounding the central portion (111) of the second body part (220), and a fourth side flange (435) joined to the central portion (111) along the fourth boundary bend (433), the fourth side flange (435) having a fourth inner end edge (403) that contacts the central web (3) of the wall stud (2), the fourth inner end edge (403) being at least partially coincident with the second inner edge (223) of the second body part (220).

34. The building connection (1) of claim 33 wherein:
  a. the third inner end edge (303) of the third side flange (335) is at least partially coincident with a portion of the third edge (336) and the third inner end edge (303) is the only portion of the third edge (336) that contacts the central web (3) of the wall stud (2); and
  b. the fourth inner end edge (403) of the fourth side flange (435) is at least partially coincident with a portion of the fourth edge (436) and the fourth inner end edge (403) is the only portion of the fourth edge (436) that contacts the central web (3) of the wall stud (2).

35. The building connection (1) of claim 33 wherein:
  a. one of the third and fourth inner end edges (303 and 403) on the third and fourth side flanges (335 and 435) of the bridging connector (19) is closer to the opening (8) in the central web (3) of the wall stud (2) than the other of the third and fourth inner end edges (303 and 403).

36. The building connection (1) of claim 31 wherein:
  a. one of the first and second inner end edges (103 and 203) on the first and second side flanges (35 and 235) of the bridging connector (19) is closer to the opening (8) in the central web (3) of the wall stud (2) than the other of the first and second inner edges (103 and 203).

* * * * *